United States Patent
Shin et al.

(10) Patent No.: US 7,752,493 B2
(45) Date of Patent: Jul. 6, 2010

(54) HIGH RELIABILITY SYSTEM, REDUNDANT CONSTRUCTION CONTROL METHOD, AND PROGRAM

(75) Inventors: Eiju Shin, Kawasaki (JP); Baku Tamura, Kawasaki (JP); Kazuhide Imaeda, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 1503 days.

(21) Appl. No.: 10/892,240

(22) Filed: Jul. 16, 2004

(65) Prior Publication Data
US 2005/0197718 A1 Sep. 8, 2005

(30) Foreign Application Priority Data
Mar. 8, 2004 (JP) .............................. 2004-063506

(51) Int. Cl.
*G06F 11/00* (2006.01)

(52) U.S. Cl. ...................................................... 714/12

(58) Field of Classification Search ..................... 714/9, 714/10, 11, 12, 13; 700/82
See application file for complete search history.

(56) References Cited

U.S. PATENT DOCUMENTS

| | | | | |
|---|---|---|---|---|
| 4,562,575 A | * | 12/1985 | Townsend ..................... | 714/11 |
| 4,610,013 A | * | 9/1986 | Long et al. ..................... | 714/11 |
| 5,251,299 A | * | 10/1993 | Masuda et al. ................. | 714/10 |
| 5,485,604 A | * | 1/1996 | Miyoshi et al. ................ | 714/10 |
| 5,696,895 A | * | 12/1997 | Hemphill et al. ............... | 714/4 |
| 5,699,504 A | * | 12/1997 | Mano ........................... | 714/13 |
| 5,751,932 A | * | 5/1998 | Horst et al. .................... | 714/12 |
| 5,951,694 A | * | 9/1999 | Choquier et al. ............... | 714/15 |
| 6,104,871 A | * | 8/2000 | Badovinatz et al. .......... | 718/100 |
| 6,141,770 A | * | 10/2000 | Fuchs et al. ................... | 714/11 |
| 6,505,257 B2 | * | 1/2003 | Murata et al. .................. | 710/8 |
| 6,629,264 B1 | * | 9/2003 | Sicola et al. .................. | 714/15 |
| 6,931,568 B2 | * | 8/2005 | Abbondanzio et al. ........ | 714/11 |
| 7,085,959 B2 | * | 8/2006 | Safford ......................... | 714/11 |
| 7,117,390 B1 | * | 10/2006 | Klarer et al. .................. | 714/13 |

(Continued)

FOREIGN PATENT DOCUMENTS

JP 7-160522 6/1995

(Continued)

OTHER PUBLICATIONS

Japanese Office Action issued on Feb. 3, 2009 in corresponding Japanese Patent Application 2004-063506.

*Primary Examiner*—Robert Beausoliel
*Assistant Examiner*—Elmira Mehrmanesh
(74) *Attorney, Agent, or Firm*—Staas & Halsey LLP

(57) ABSTRACT

A high reliability system in which a plurality of apparatuses each having a variable function unit and a fixed function unit are mutually connected through an internal network. Pairs of apparatuses are constructed and spare apparatuses are allocated, thereby providing redundancy. Each apparatus has a service processing unit which executes the software for providing a peculiar service to every apparatus pair, a synchronization processing unit which synchronizes the services between the apparatus pair, a fault detecting unit which detects a fault of the pair partner apparatus, and a fault processing unit which, issues a pair request to the network and reconstructs an apparatus pair together with the apparatus to which the pair application has been made. The redundancy recovery after the exchange of the failed apparatus is executed automatically, thereby shortening a time in a non-redundant state.

18 Claims, 26 Drawing Sheets

U.S. PATENT DOCUMENTS

| | | | |
|---|---|---|---|
| 7,191,357 B2* | 3/2007 | Holland et al. | 714/5 |
| 7,213,167 B1* | 5/2007 | Ladonnikov | 714/11 |
| 7,251,746 B2* | 7/2007 | Fox et al. | 714/13 |
| 7,257,734 B2* | 8/2007 | Vaidyanathan | 714/13 |
| 2003/0093709 A1* | 5/2003 | Ogawa et al. | 714/4 |
| 2003/0188222 A1* | 10/2003 | Abbondanzio et al. | 714/12 |
| 2004/0078654 A1* | 4/2004 | Holland et al. | 714/13 |
| 2005/0015661 A1* | 1/2005 | Vaidyanathan | 714/13 |
| 2005/0144524 A1* | 6/2005 | Bonaccio et al. | 714/27 |
| 2005/0172164 A1* | 8/2005 | Fox et al. | 714/13 |
| 2006/0107112 A1* | 5/2006 | Michaelis et al. | 714/15 |

FOREIGN PATENT DOCUMENTS

JP     8-185330     7/1996

* cited by examiner

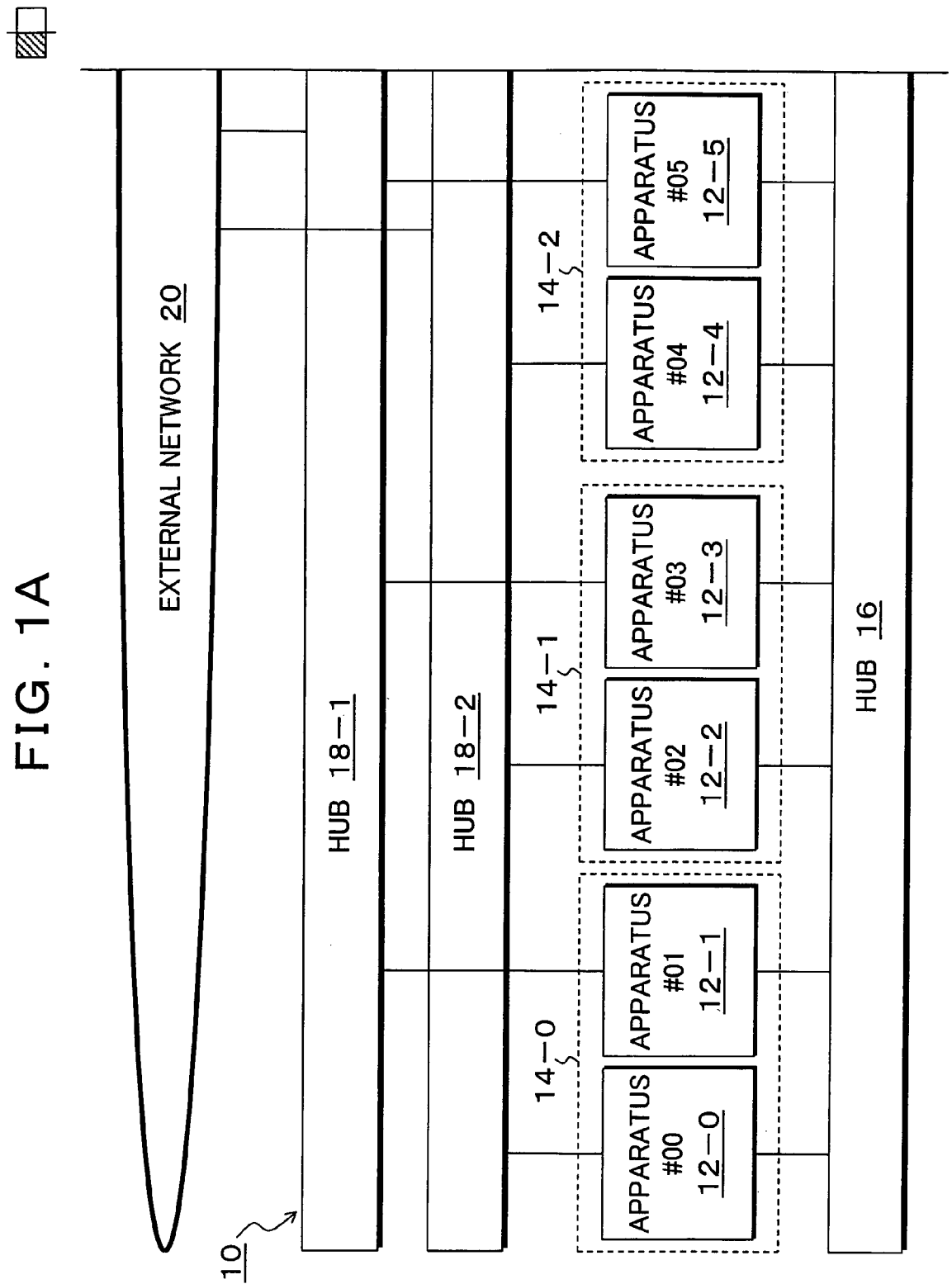

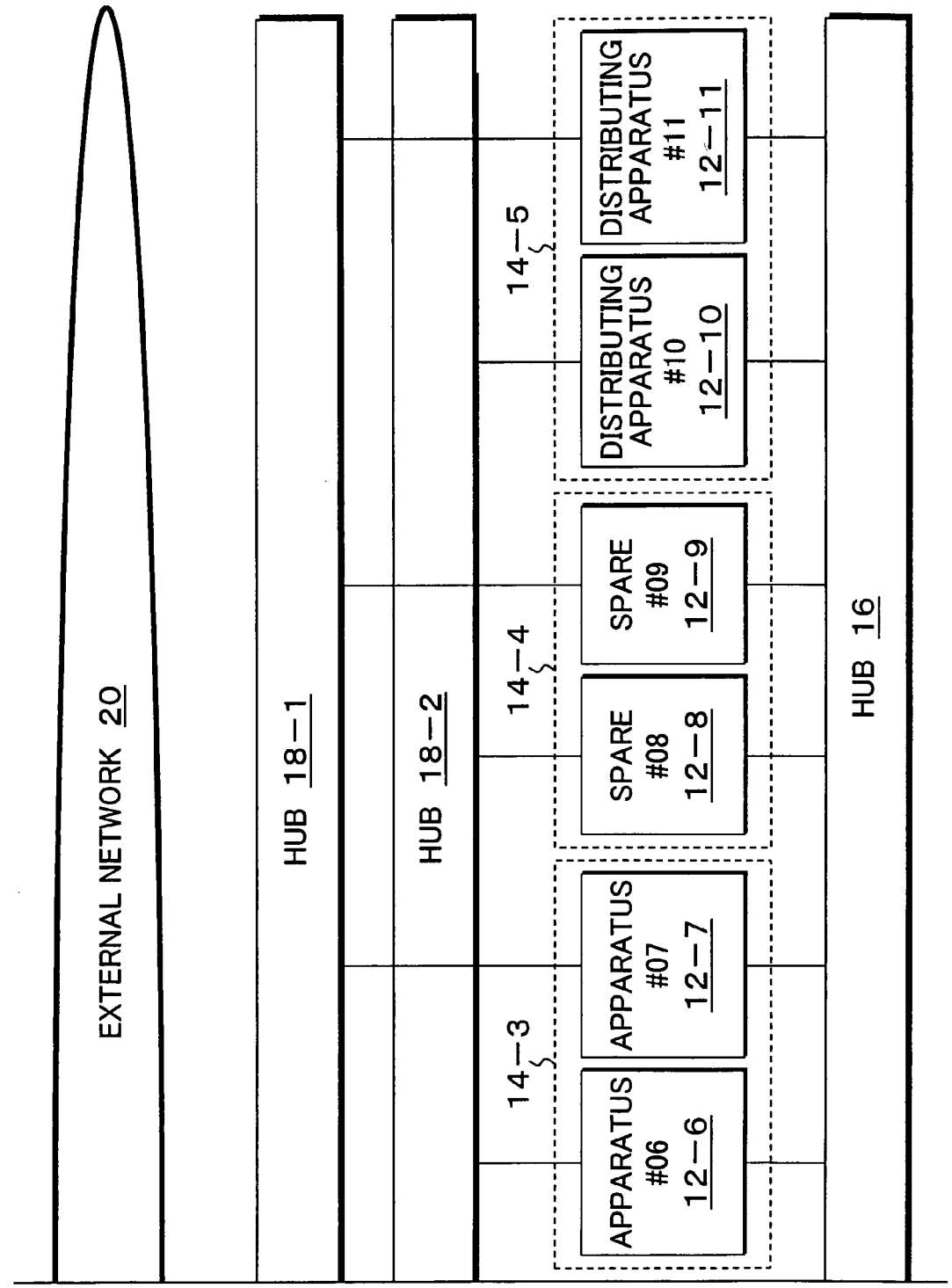

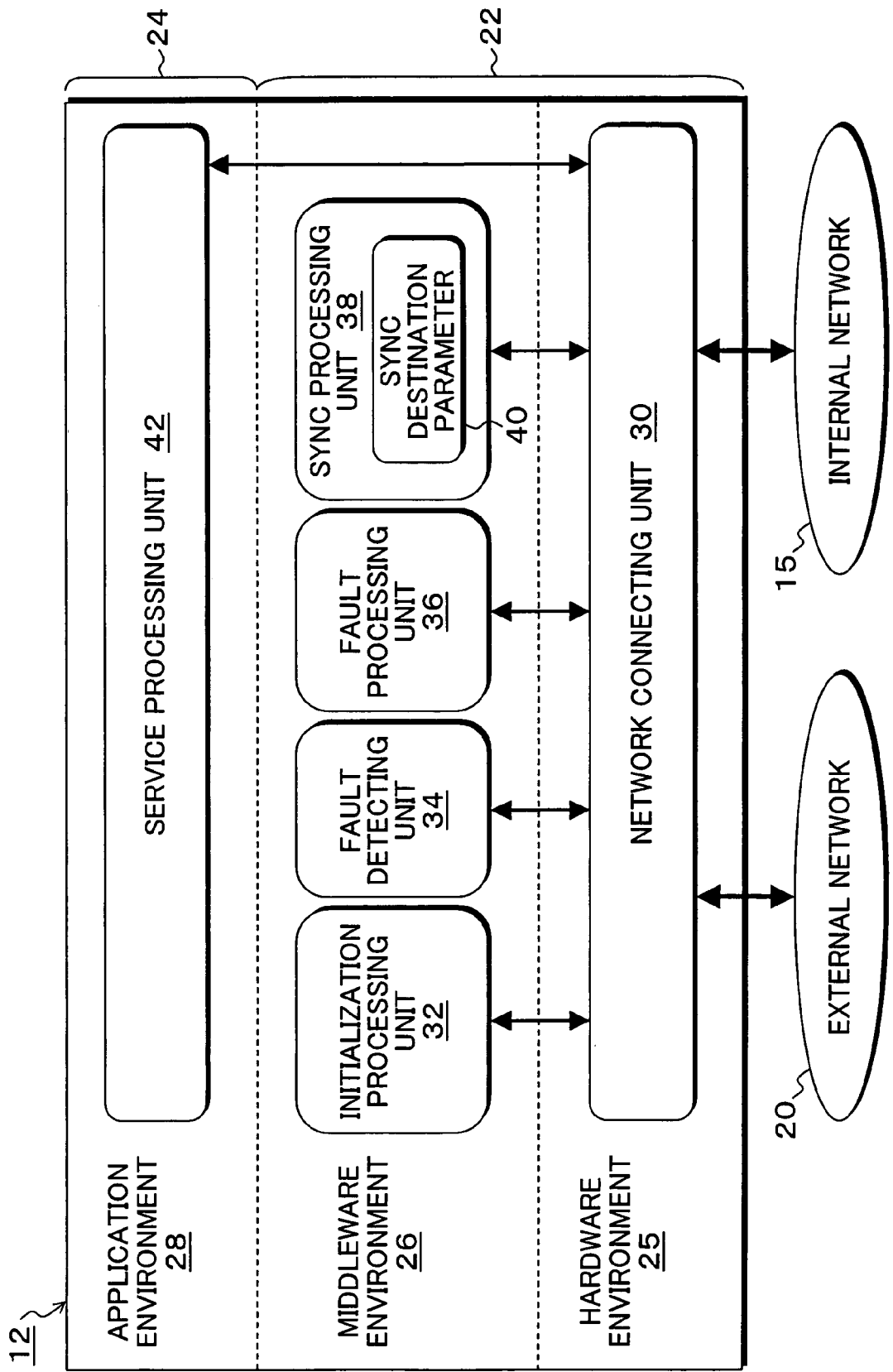

| APPARATUS NO. | COMMUNICATION IDENTIFIER | | SPARE FLAG | FAULT FLAG |
|---|---|---|---|---|
| | PAIR NO. | HUB NO. | | |
| #00 | 00 | 2 | 0 | 0 |
| #01 | 00 | 1 | 0 | 0 |
| #02 | 01 | 2 | 0 | 0 |
| #03 | 01 | 1 | 0 | 0 |
| #04 | 02 | 2 | 0 | 0 |
| #05 | 02 | 1 | 0 | 0 |
| #06 | 03 | 2 | 0 | 0 |
| #07 | 03 | 1 | 0 | 0 |
| #08 | 04 | 2 | 1 | 0 |
| #09 | 04 | 1 | 1 | 0 |
| #10 | 05 | 2 | 0 | 0 |
| #11 | 05 | 1 | 0 | 0 |

| PAIR NO. | PAIR APPARATUS NOS. |
|---|---|
| 00 | #00, #01 |
| 01 | #02, #03 |
| 02 | #04, #05 |
| 03 | #06, #07 |
| 04 | #08, #09 |
| 05 | #10, #11 |

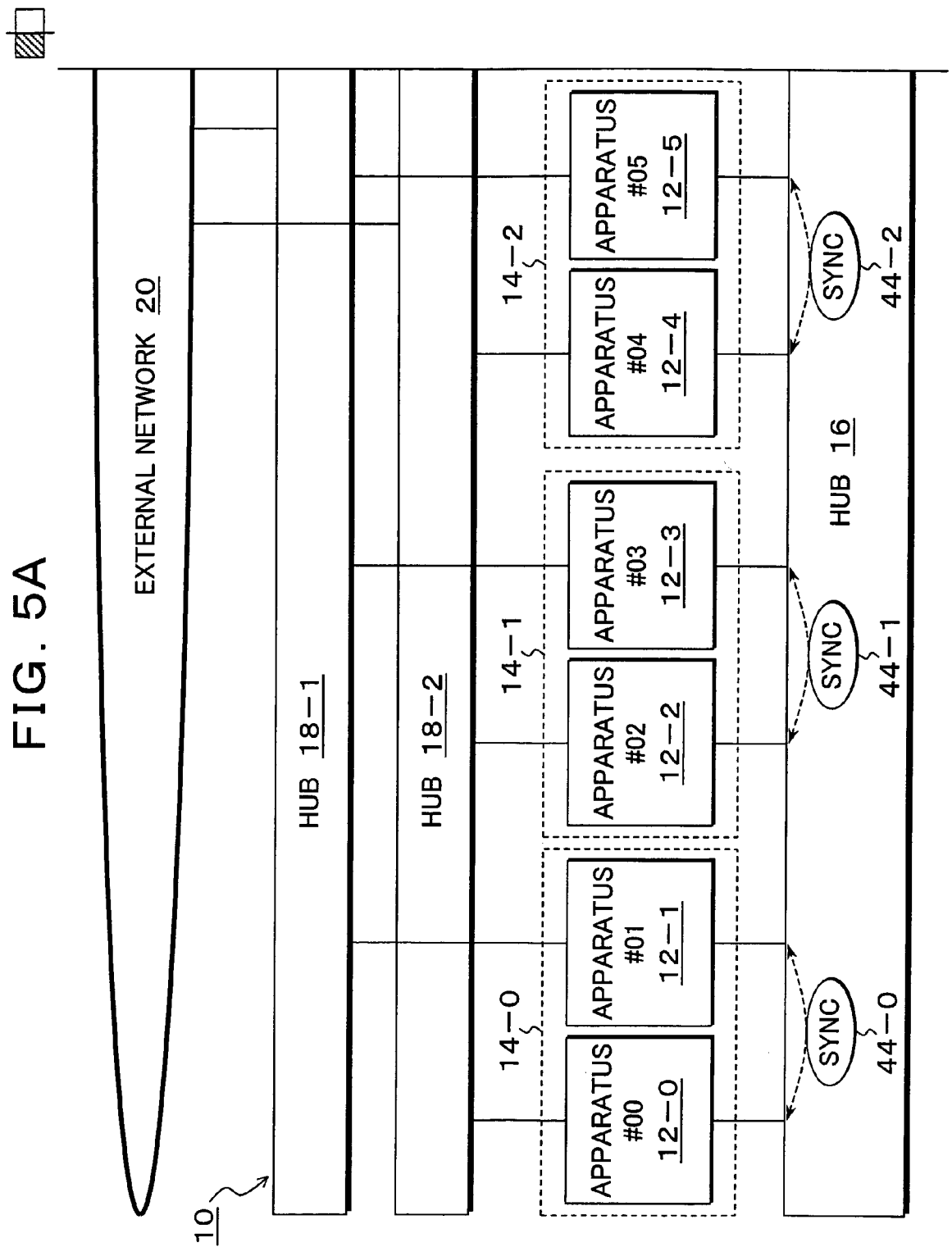

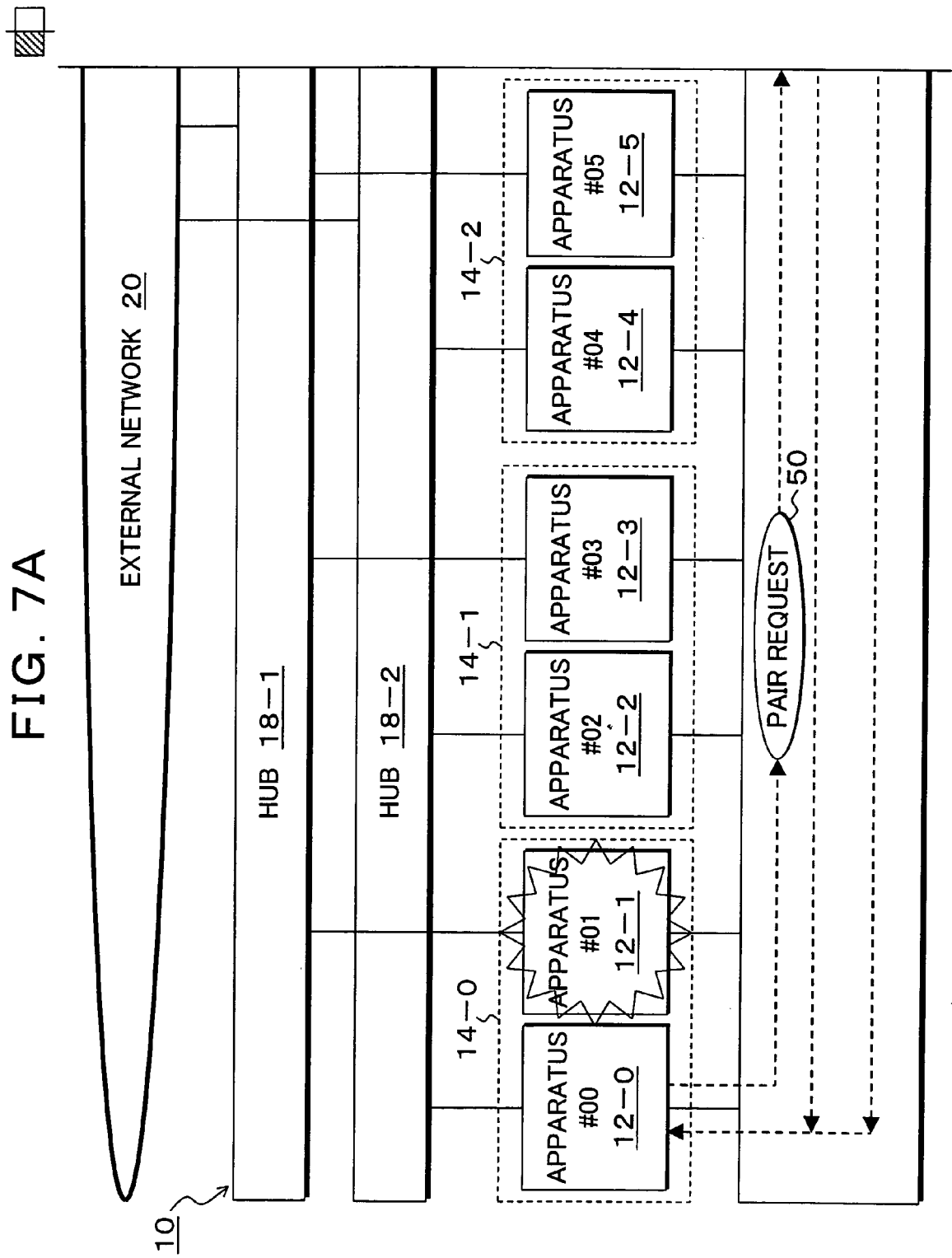

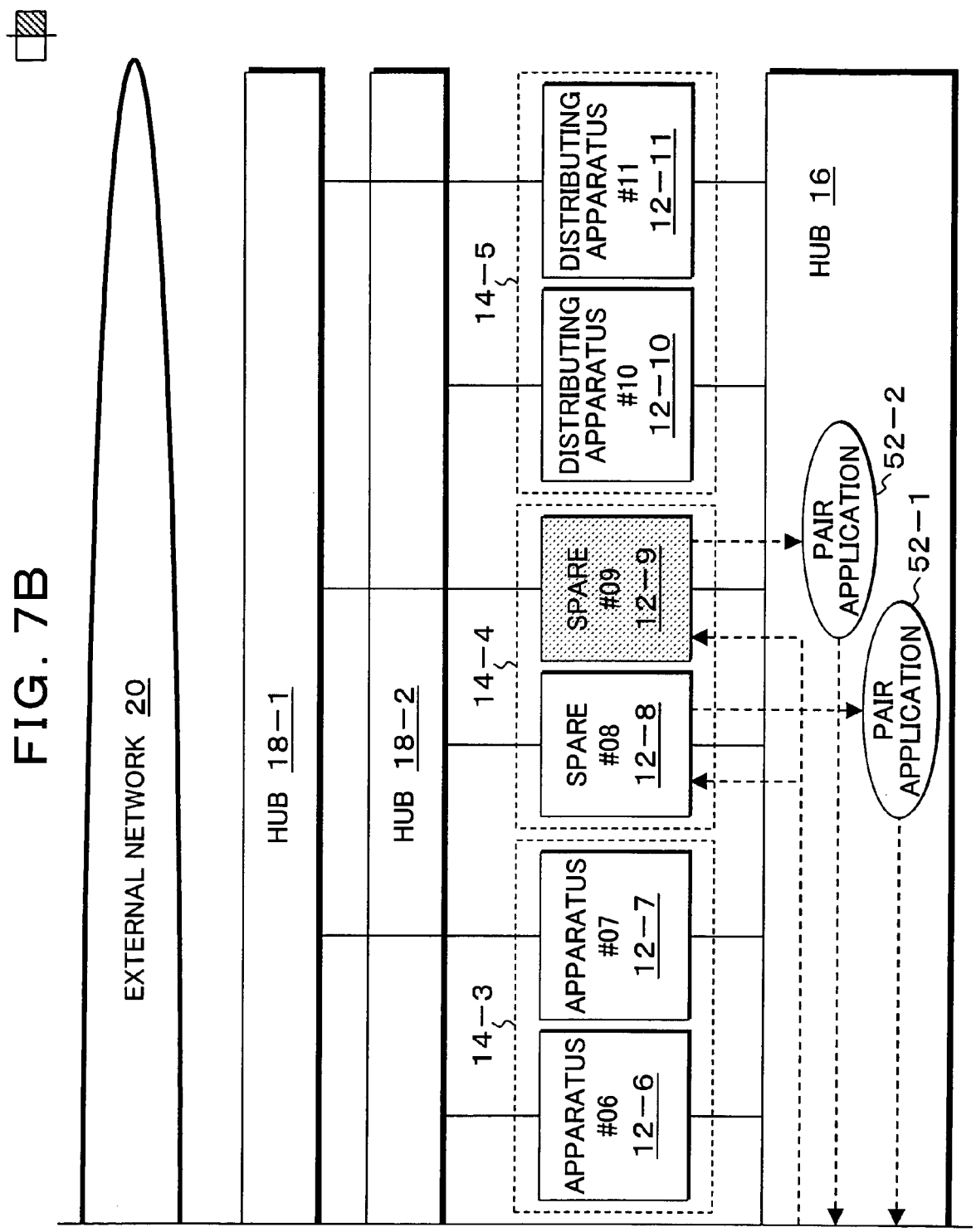

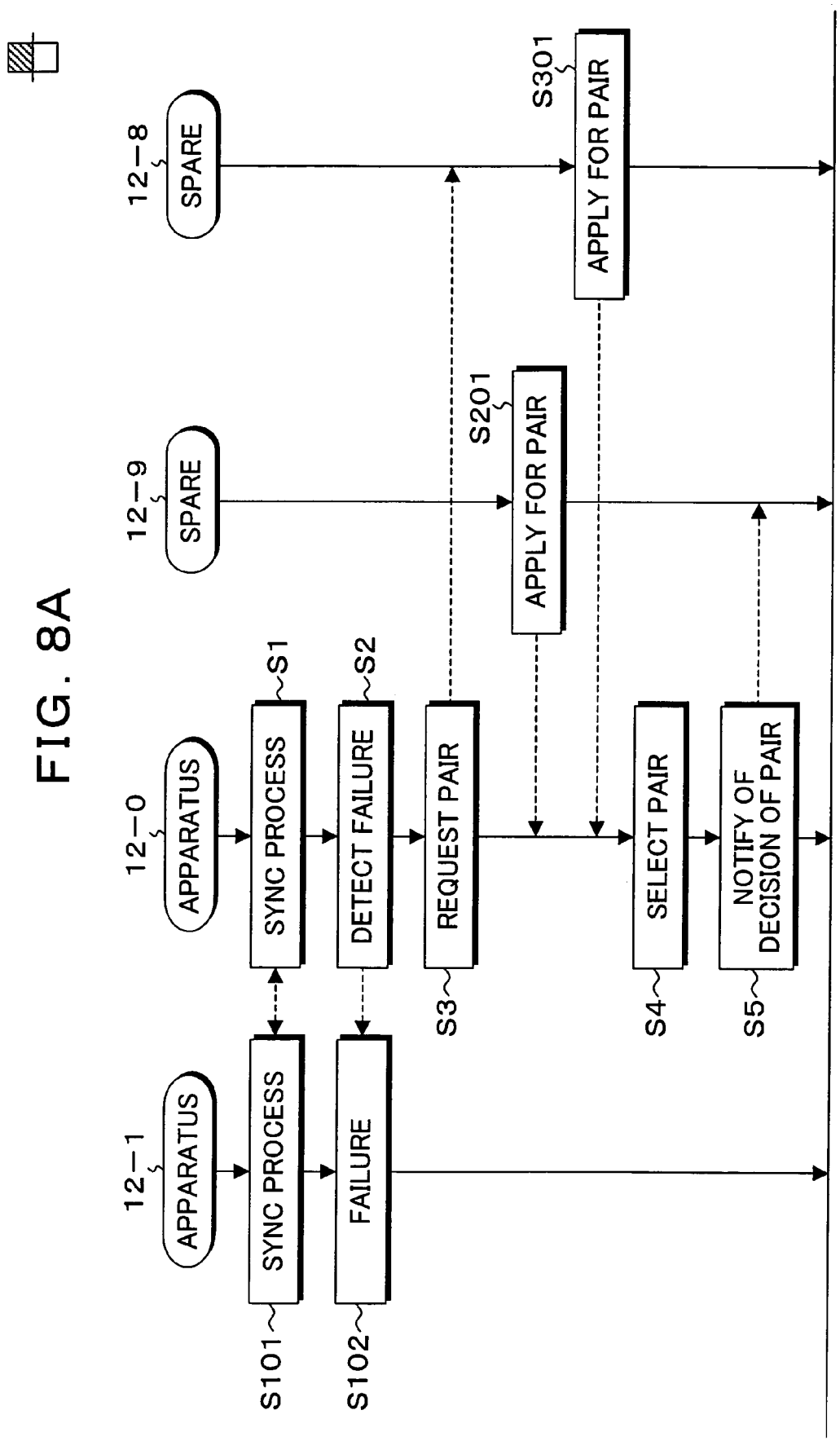

FIG. 9

| RULE NO. | RULE CONTENTS |
|---|---|
| RULE 1 | THE SAME PAIR NO. & DIFFERENT HUB NO. & THE SAME PAIR NO. AND HUB NO. (=SAME COMMUNICATION IDENTIFIER) AS THOSE OF THE LATEST PAIR PARTNER |
| RULE 2 | THE SAME PAIR NO. & DIFFERENT HUB NO. |
| RULE 3 | THE DIFFERENT PAIR NO. & DIFFERENT HUB NO. & THE SAME PAIR NO. AND HUB NO. (=SAME COMMUNICATION IDENTIFIER) AS THOSE OF THE LATEST PAIR PARTNER |
| RULE 4 | THE DIFFERENT PAIR NO. & DIFFERENT HUB NO. |
| RULE 5 | THE DIFFERENT PAIR NO. & SAME HUB NO. |

| FAULT APPARATUS #01 | PAIR NO.=00 | HUB NO.=2 | 12-1 |

FIG. 10B

| PAIR REQUEST APPARATUS #00 | PAIR NO.=00 | HUB NO.=1 | 12-0 |

| RULE NO. | RULE CONTENTS |
|---|---|
| RULE 1 | THE SAME PAIR NO.=00 & DIFFERENT HUB NO.=1 & THE SAME PAIR NO. AND HUB NO.=00, 1 AS THOSE OF THE LATEST PAIR PARTNER |
| RULE 2 | THE SAME PAIR NO.=00 & DIFFERENT HUB NO.=1 |
| RULE 3 | THE DIFFERENT PAIR NO.=xx & DIFFERENT HUB NO.=1 & THE SAME PAIR NO. AND HUB NO.=xx, 1 AS THOSE OF THE LATEST PAIR PARTNER |
| RULE 4 | THE DIFFERENT PAIR NO.=xx & DIFFERENT HUB NO.=1 |
| RULE 5 | THE DIFFERENT PAIR NO.=xx & SAME HUB NO.=2 |

| APPARATUS NO. | COMMUNICATION IDENTIFIER | | SPARE FLAG | FAULT FLAG |
|---|---|---|---|---|
| | PAIR NO. | HUB NO. | | |
| #00 | 00 | 2 | 0 | 0 |
| #01 | 00 | 1 | 0 | 0→1 |
| #02 | 01 | 2 | 0 | 0 |
| #03 | 01 | 1 | 0 | 0 |
| #04 | 02 | 2 | 0 | 0 |
| #05 | 02 | 1 | 0 | 0 |
| #06 | 03 | 2 | 0 | 0 |
| #07 | 03 | 1 | 0 | 0 |
| #08 | 04 | 2 | 1 | 0 |
| #09 | 04→00 | 1 | 1→0 | 0 |
| #10 | 05 | 2 | 0 | 0 |
| #11 | 05 | 1 | 0 | 0 |

| PAIR NO. | PAIR APPARATUS NOS. |
|---|---|
| 00 | #00, #01 → #00, #09 |
| 01 | #02, #03 |
| 02 | #04, #05 |
| 03 | #06, #07 |
| 04 | #08, #09 → #08, #** |
| 05 | #10, #11 |

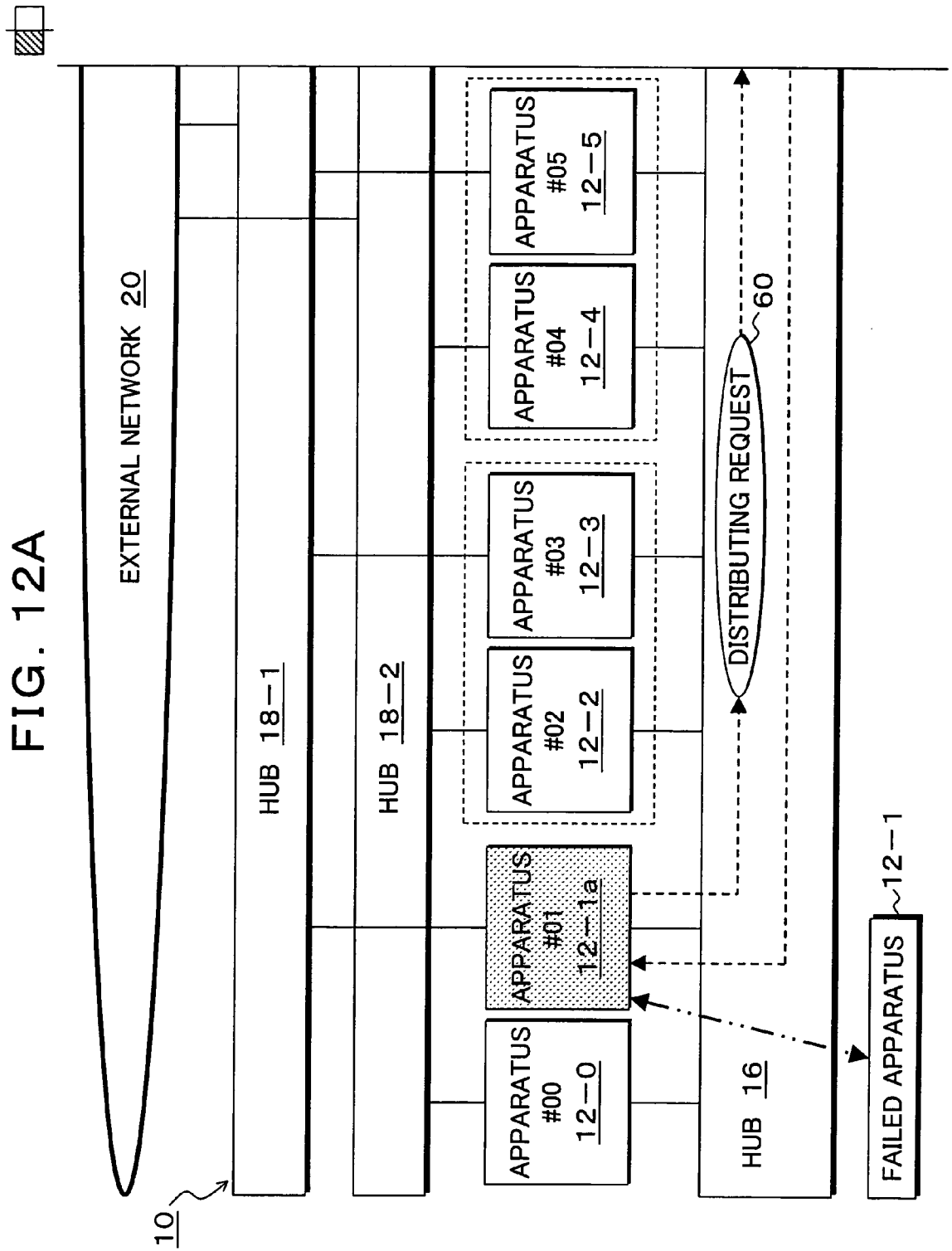

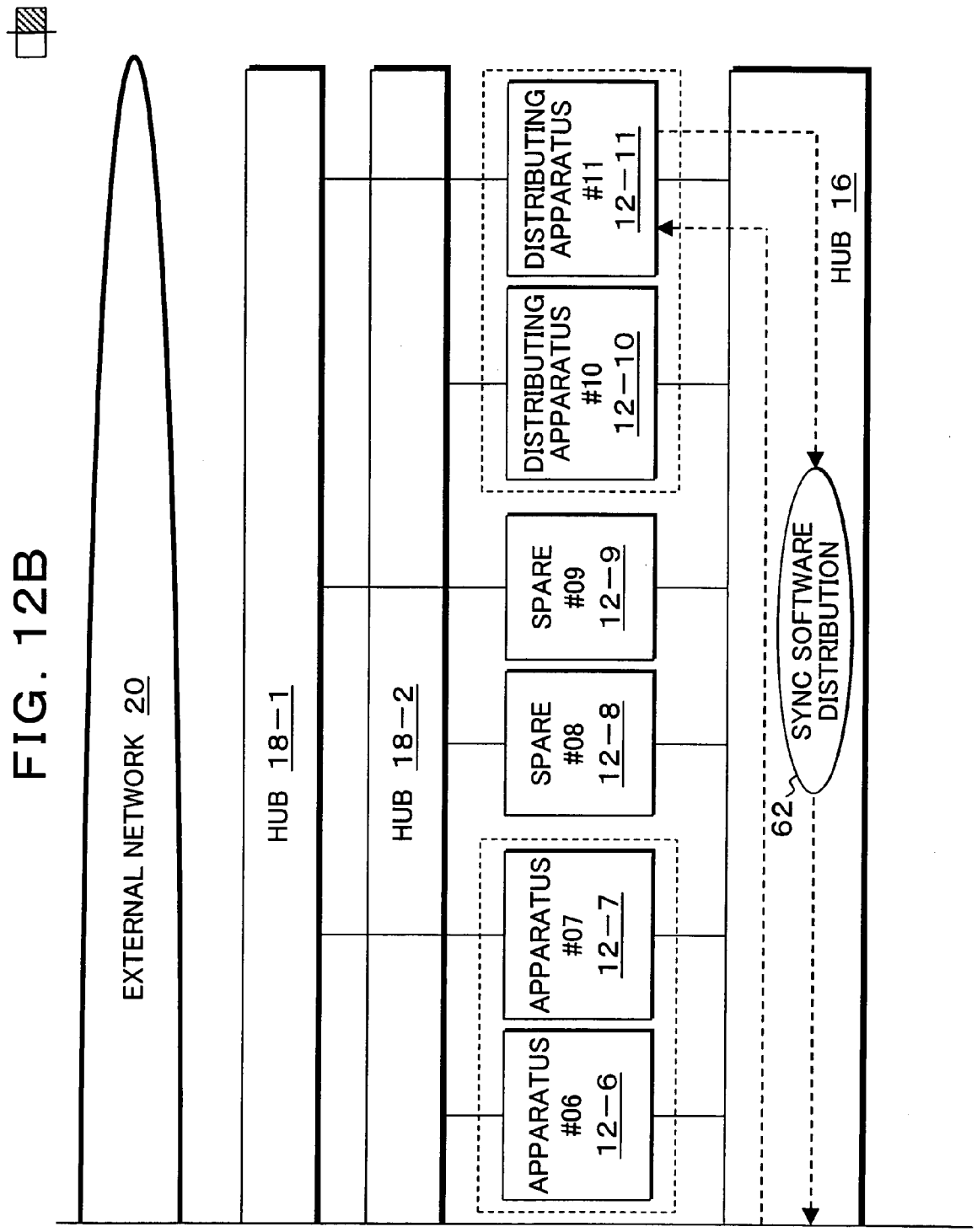

| APPARATUS NO. | COMMUNICATION IDENTIFIER | | SPARE FLAG | FAULT FLAG |
|---|---|---|---|---|
| | PAIR NO. | HUB NO. | | |
| #00 | 00 | 2 | 0 | 0 |
| #01 | 00→04 | 1 | 0→1 | 1→0 |
| #02 | 01 | 2 | 0 | 0 |
| #03 | 01 | 1 | 0 | 0 |
| #04 | 02 | 2 | 0 | 0 |
| #05 | 02 | 1 | 0 | 0 |
| #06 | 03 | 2 | 0 | 0 |
| #07 | 03 | 1 | 0 | 0 |
| #08 | 04 | 2 | 1 | 0 |
| #09 | 00 | 1 | 0 | 0 |
| #10 | 05 | 2 | 0 | 0 |
| #11 | 05 | 1 | 0 | 0 |

| PAIR NO. | PAIR APPARATUS NOS. |
|---|---|
| 00 | #00, #09 |
| 01 | #02, #03 |
| 02 | #04, #05 |
| 03 | #06, #07 |
| 04 | #08, #** → #08, #01 |
| 05 | #10, #11 |

HIGH RELIABILITY SYSTEM, REDUNDANT CONSTRUCTION CONTROL METHOD, AND PROGRAM

BACKGROUND OF THE INVENTION

1. Field of the Invention

The invention relates to a high reliability system in which apparatus pairs are constructed with respect to a plurality of apparatuses connected through a network to thereby give redundancy, a redundant construction control method, and a program. More particularly, the invention relates to a high reliability system, a redundant construction control method, and a program in which a synchronizing process of the apparatus pairs is provided as a fixed function, service processes peculiar to the apparatus are provided as a variable function according to an exchange of software, and each apparatus can autonomously recover the redundancy in the case of an apparatus failure.

2. Description of the Related Arts

Hitherto, for the reduction of unexpected down-time in a processing system using a computer, it has been necessary to raise reliability of hardware itself or shorten the time that is required for a recovery process. There is a redundant system as a method of improving the reliability of the hardware. According to the redundant system, redundancy is given by multiplexing the hardware and allowing a plurality of apparatuses to have a portion which executes the same processing function, thereby enabling a process to be continued even if a certain portion fails. When such a redundant system is seen as a whole, the reliability of the original hardware can be theoretically improved by the power of the multiplexing number.

In the case of the failure of the redundant system, a process for recovering the system means a process for recovering the redundancy of the apparatus and it always includes some parts that require human intervention as follows. Therefore, there is a limitation in the reduction of such a process.

(1) Time after the occurrence of the fault till the watcher recognizes it
(2) Time after the recognition of the watcher till he liaises with a maintenance center
(3) Time after the liaison with the maintenance center till a maintenance clerk arrives at the site
(4) Time after the start of the maintenance operation till the completion of the recovery operation At present, for example, the following two methods are used to solve the problems in the system recovery mentioned above.

(1) Apparatus monitoring by the user
(2) 24-hour monitoring service by a remote monitoring apparatus, an automatic notifying apparatus, and a provider However, according to those methods, only the time for the watcher to recognize the occurrence of the fault and liaises with the maintenance center can be shortened in the recovery process and the following problems still exist. That is, costs mainly comprising personnel costs of the user himself and the system provider rise, it is indispensable to assure a communication path for automatically liaising with the maintenance center, and further, moving time necessary for the maintenance clerk to arrive has a bearing on a geographical factor such as a setting location of the maintenance center.

In the conventional system, the redundancy realizing method of duplexing the apparatuses and a method of automatically assembling spare apparatuses are each independent. For example, according to the conventional redundancy realizing method, even at the time of occurrence of the failure, the non-stop operation of service processes is realized by the redundancy of the service processes by software in addition to the redundancy of the hardware (refer to JP-A-2001-523855). However, nothing is considered about the automatization of the recovery of the redundancy after the exchange of the failed apparatus, artificial operations for writing software for providing the same service processes as those of the failed apparatus into the exchanged apparatus and starting a synchronizing process are needed after the exchange of the failed apparatus. There is such a problem that the recovery of the redundancy is troublesome and time-consuming.

According to conventional methods of automatically assembling spare apparatuses, redundancy of hardware and an automatic assembly of the spare apparatuses are realized (refer to JP-A-07-121395 and JP-A-2000-148709). However, there is such a problem that redundancy of service processes by software is not realized and if an apparatus fails, it is necessary to write back the software for realizing the service processes of the failed apparatus from a dedicated apparatus which collectively holds software for services into the spare apparatuses which have automatically been assembled, so that the service processes which had been provided by the failed apparatus have to be stopped meanwhile.

SUMMARY OF THE INVENTION

According to the invention, there are provided a high reliability system, a redundant construction control method, and a program in which with respect to a system in which redundancy of service processes peculiar to an apparatus and an automatic assembly of spare apparatuses are combined as a target, a redundancy recovery at the time of an apparatus failure and an exchange of the failed apparatus is automatized, thereby shortening a time of a non-redundancy state.

According to the invention, there is provided a high reliability system in which a plurality of apparatuses each comprising a variable function unit whose function is changed by replacement of software and a fixed function unit according to hardware or fixed software are mutually connected through an internal network, apparatus pairs are constructed with respect to the plurality of apparatuses, and spare apparatuses are allocated, thereby giving redundancy, and those apparatuses are further connected to an external network. According to the invention, the above high reliability system comprises: a service processing unit which executes the software for providing a peculiar service every apparatus pair; a synchronization processing unit which synchronizes processes by the service processing unit between the apparatuses constructing the apparatus pair; a fault detecting unit which detects a fault of the pair partner apparatus; and a fault processing unit which, when the fault of the pair partner apparatus is detected by the fault detecting unit, issues a pair request to the internal network and reconstructs an apparatus pair together with the apparatus to which the pair application has been made.

The fault processing unit transfers and copies the software for realizing the function of the service processing unit and processing data to the pair partner apparatus through the internal network, thereby constructing the same service processing unit and shifting it to the synchronizing process. When the pair applications are received from a plurality of processing apparatuses, the fault processing unit preferentially selects the vacant apparatus other than the spare apparatuses and reconstructs the apparatus pair, and when there is no application from the vacant apparatus, the fault processing unit selects the spare apparatus and reconstructs the apparatus pair.

The synchronization processing unit manages a management table in which pair numbers (synchronization destination parameters) showing the pairs in correspondence to apparatus numbers have been stored, recognizes the apparatus having the same pair number as that of the self apparatus in the management table as a pair partner apparatus, and executes the synchronizing process. The synchronization processing unit further stores a hub number of a hub connected to the external network, a spare flag showing the spare apparatus, and a failure flag showing the failed apparatus into the management table in addition to the pair numbers corresponding to the apparatus numbers, and when the pair applications are received from a plurality of processing apparatuses, the fault processing unit selects a new pair partner apparatus on the basis of the pair number and the hub number in the management table and reconstructs the apparatus pair.

When the pair applications are received from a plurality of processing apparatuses, the fault processing unit sequentially applies the following five rules and determines and reconstructs the pair partner apparatus.

(1) A first rule by which the apparatus having the different hub number and the same pair number as those of the partner apparatus and having the same hub number and the same pair number as those of the apparatus which has been the latest pair is set to the pair partner apparatus.

(2) A second rule by which the apparatus having the different hub number and the same pair number is set to the pair partner apparatus.

(3) A third rule by which the apparatus having the different hub number and the different pair number as those of the partner apparatus and having the same hub number and the same pair number as those of the apparatus which has been the latest pair is set to the pair partner apparatus.

(4) A fourth rule by which the apparatus having the different hub number and the different pair number is set to the pair partner apparatus.

(5) A fifth rule by which the apparatus having the same hub number and the different pair number is set to the pair partner apparatus.

In the high reliability system of the invention, a combination of the pair number and the hub number is set to a communication identifier of the apparatus. The high reliability system of the invention further comprises: an initialization processing unit which, when the failed apparatus is exchanged to a new apparatus, requests the network to distribute synchronizing function software, receives the distribution of the software for synchronization from one of the specific pair apparatuses to which the software has been allocated by a software distributing apparatus, and constructs the synchronization processing unit, the fault detecting unit, and the fault processing unit into a self fixed function unit. The fault processing unit constructed in the fixed function unit of the exchanged apparatus by the initialization processing unit issues a spare adding notification to the internal network and constructs a spare apparatus pair together with the apparatus to which the pair application has been made.

According to the invention, there is provided a redundant construction control method of a high reliability system in which a plurality of apparatuses each comprising a variable function unit whose function is changed by replacement of software and a fixed function unit according to hardware or fixed software are mutually connected through an internal network, apparatus pairs are constructed with respect to the plurality of apparatuses, and spare apparatuses are allocated, thereby giving redundancy, and those apparatuses are further connected to an external network. The above redundant construction control method comprises:

a service processing step wherein the software for providing a peculiar service every apparatus pair is executed;

a synchronization processing step wherein processes by the service processing step are synchronized between the apparatuses constructing the apparatus pair;

a fault detecting step wherein a fault of the pair partner apparatus is detected; and a fault processing step wherein, when the fault of the pair partner apparatus is detected in the fault detecting step, a pair request is issued to the network and an apparatus pair is reconstructed together with the apparatus to which the pair application has been made.

According to the invention, there is provided a program which is executed by a computer constructing each apparatus of a high reliability system in which a plurality of apparatuses each comprising a variable function unit whose function is changed by replacement of software and a fixed function unit according to hardware or fixed software are mutually connected through an internal network, apparatus pairs are constructed with respect to the plurality of apparatuses, and spare apparatuses are allocated, thereby giving redundancy, and those apparatuses are further connected to an external network. This program allows the computer to execute:

a service processing step wherein the software for providing a peculiar service every apparatus pair is executed;

a synchronization processing step wherein processes by the service processing step are synchronized between the apparatuses constructing the apparatus pair;

a fault detecting step wherein a fault of the pair partner apparatus is detected; and a fault processing step wherein, when the fault of the pair partner apparatus is detected in the fault detecting step, a pair request is issued to the network and an apparatus pair is reconstructed together with the apparatus to which the pair application has been made.

Details of a redundant construction control method and a program according to the invention are fundamentally the same as those in the case of the high reliability system.

According to the invention, the pair apparatuses are constructed with respect to the plurality of apparatuses constructing the system, the service processes by the same software are synchronously executed, and the redundancy is given, thereby continuing the services in the case of the apparatus failure. The functions of the failed apparatus are substituted by the automatic assembly of the spare apparatuses. Thus, the redundancy is automatically recovered, the time in the non-redundancy state is reduced to the bare minimum, and the reliability of the system can be remarkably improved. The redundancy can be efficiently recovered in a short time without needing a hand of anybody. According to the invention, every apparatus constructing the system is divided into the fixed function unit and the variable function unit and each spare apparatus has a fixed function unit which is also common to all the other apparatuses. Therefore, upon redundancy recovery, the software and the data of the variable function unit of the apparatus which paired with the failed apparatus are copied through the network into the spare apparatuses which have automatically been assembled, so that the redundancy is recovered in a short time and the system can be shifted to the synchronizing process as a pair apparatus. Therefore, even when the service processes peculiar to each pair apparatus are executed, there is no need to previously and individually provide the spare apparatuses in correspondence to those different service processes. It is sufficient to merely provide the necessary minimum number of spare apparatuses as common apparatuses for the apparatuses of the different service processing functions.

According to the invention, since the processing function for determining a new pair partner apparatus in response to the failure of the pair partner apparatus and recovering the redundancy is provided for all of the apparatuses, a dedicated managing apparatus for selecting the spare apparatus which is used as a substitute for the failed apparatus is unnecessary. The system construction is simplified. Also with respect to the managing function, its redundancy is given and the reliability can be improved. According to the invention, as for the apparatus which has received the distributing request and has been exchanged at the time of the exchange of the failed apparatus, by providing the distributing function of the software for synchronization for the specific apparatus (distributing apparatus) in the system, the dedicated software distributing apparatus is unnecessary. The system construction is simplified. Also with respect to the software distributing function, its redundancy is given and the reliability can be improved.

According to the invention, further, a communication path and a communicating apparatus for synchronization between the pair apparatuses according to the redundancy, a communication path and a communicating apparatus for a fault process such pair request or pair application, and further, a communication path and a communicating apparatus for software distribution at the time of the exchange of the failed apparatus are necessary. However, since those communication paths and the communicating apparatuses are not simultaneously used, they can be constructed as a common communication path and a common communicating apparatus. Thus, also with respect to the common communication path and the common communicating apparatus, a redundancy as hardware can be easily realized at low costs.

The above and other objects, features, and advantages of the present invention will become more apparent from the following detailed description with reference to the drawings.

BRIEF DESCRIPTION OF THE DRAWINGS

FIGS. 1A and 1B are explanatory diagrams of a high reliability system according to the invention;

FIG. 2 is a block diagram of a functional construction of each apparatus provided in the system of FIGS. 1A and 1B;

FIGS. 4A and 4B are explanatory diagrams of a management table and a pair table which are used in the apparatus of the invention;

FIGS. 5A and 5B are explanatory diagrams of a synchronizing process in the high reliability system of the invention;

FIGS. 7A and 7B are explanatory diagrams of a redundancy recovery process in the case where an apparatus failure occurs in the high reliability system of the invention;

FIGS. 8A and 8B are time charts for the redundancy recovery process for the apparatus failure in FIGS. 7A and 7B;

FIG. 9 is an explanatory diagram of a rule table for selecting a pair in response to a pair application;

FIGS. 10A to 10C are specific explanatory diagrams of the rule table for the pair selection in FIG. 9;

FIGS. 11A and 11B are explanatory diagrams of a management table and a pair table which are changed in the redundancy recovery process in FIGS. 7A and 7B;

FIGS. 12A and 12B are explanatory diagrams of the redundancy recovery process in the case where a failed apparatus is exchanged;

FIGS. 14A and 14B are explanatory diagrams of a management table and a pair table which are changed in the redundancy recovery process in FIGS. 12A and 12B;

DETAILED DESCRIPTION OF THE PREFERRED EMBODIMENTS

Figure 3:
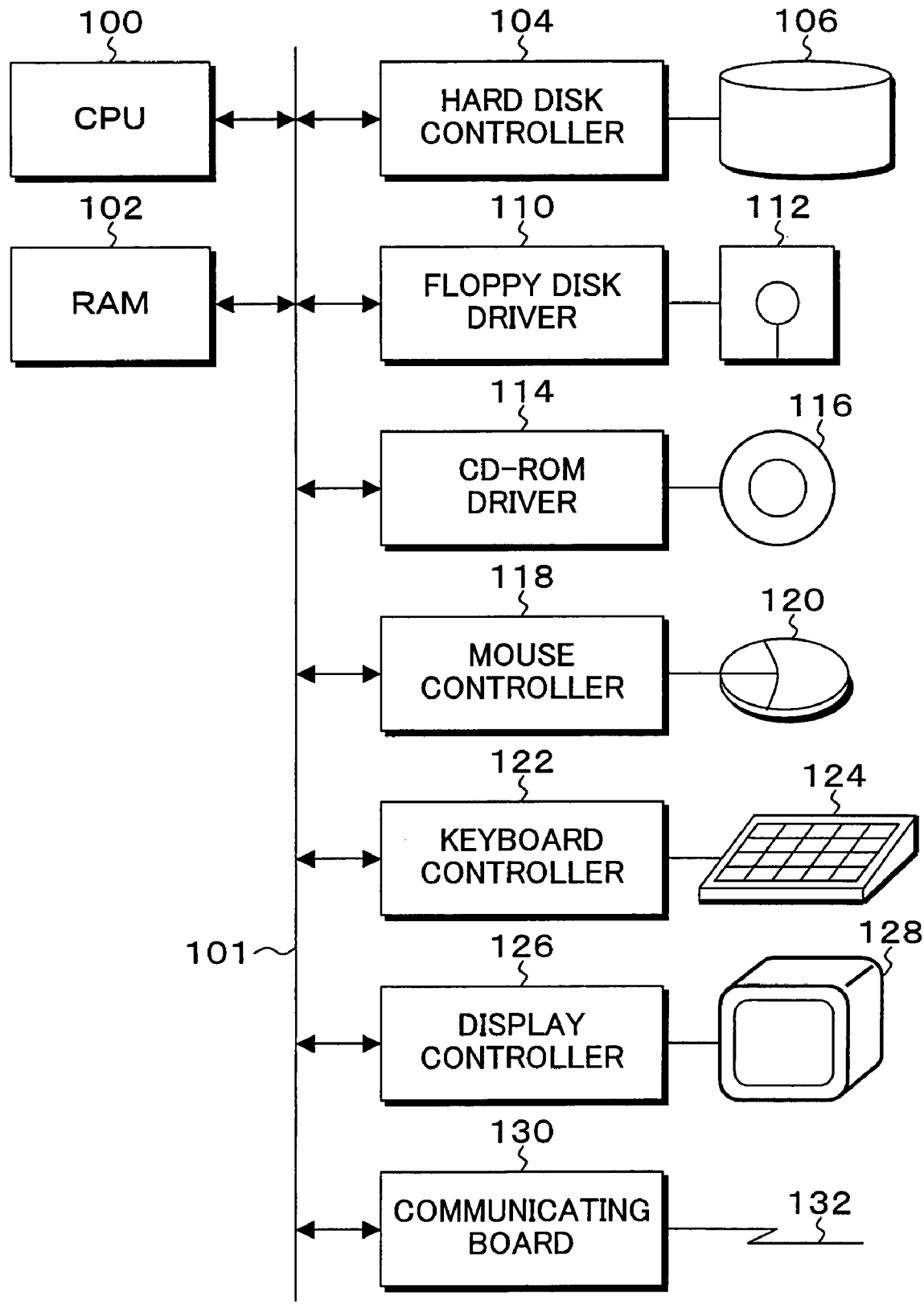
FIG. 3 is an explanatory diagram of a hardware environment of a computer to which the apparatus in FIG. 2 is applied.

FIGS. 1A and 1B are explanatory diagrams of a high reliability system according to the invention. In FIGS. 1A and 1B, a high reliability system 10 of the invention has a plurality of apparatuses 12-0 to 12-11 which are realized by computers. A hub 16 for internal communication is provided for the apparatuses 12-0 to 12-11. All of the apparatuses 12-0 to 12-11 are port-connected in common to the hub 16. Hubs 18-1 and 18-2 for external communication are provided for the apparatuses 12-0 to 12-11. The apparatuses 12-1, 12-3, 12-5, 12-7, 12-9, 12-11 are connected to the hub 18-1, respectively. The apparatuses 12-0, 12-2, 12-4, 12-6, 12-8, 12-10 are connected to the hub 18-2, respectively. The hubs 18-1 and 18-2 are connected to an external network 20.

In the high reliability system 10 of the embodiment, apparatus numbers #00 to #11 have been allocated to the apparatuses 12-0 to 12-11, respectively. Among the apparatuses 12-0 to 12-11, pairs 14-0, 14-1, 14-2, 14-3, 14-4, and 14-5 are constructed in order of the apparatus numbers and each pair is constructed by two apparatuses. The two apparatuses included in each of the pairs 14-0 to 14-5 synchronously execute the same process, thereby giving a redundancy. Although all hardware of the apparatuses 12-0 to 12-11 constructing the high reliability system 10 is common, their roles on the system differ. In the high reliability system of the invention, the following three functions are allocated to the apparatuses on the system.

(1) The apparatuses which execute services peculiar to the apparatuses
(2) The apparatuses for spare
(3) The apparatuses which execute services peculiar to the apparatuses and distribute software for synchronization In the embodiment of the high reliability system 10 in FIGS. 1A and 1B, the apparatuses 12-0 to 12-7 constructing the pairs 14-0 to 14-3 execute the service processes peculiar to the apparatuses, the apparatuses 12-8 and 12-9 of the pair 14-4 are the spare apparatuses, and further, the apparatuses 12-10 and 12-11 of the pair 14-5 are the apparatuses which execute the service processes peculiar to the apparatuses and, at the same time, have the function of a distributing apparatus for distributing software for synchronization.

FIG. 2 is a block diagram of a functional construction of each apparatus according to the invention provided in the high reliability system of FIGS. 1A and 1B. In FIG. 2, the apparatus 12 which is used in the high reliability system of the invention is constructed by a fixed function unit 22 and a variable function unit 24. The fixed function unit 22 is a portion corresponding to hardware or fixed software such as OS. Functions of the fixed function unit 22 are not changed during the operation of the apparatus 12. On the other hand, the variable function unit 24 is a portion in which functions can be changed by replacement of the software. In the embodiment, the fixed function unit 22 in the apparatus 12 is divided into a hardware environment 25 and a middleware environment 26. A network connecting unit 30 is provided for the hardware environment 25, communicates with the external network 20 through the hubs 18-1 and 18-2 in FIGS. 1A and 1B, and at the same time, makes communication with an internal network 15 as communication between the apparatuses through the hub 16 in FIGS. 1A and 1B.

Functions as an initialization processing unit 32, a fault detecting unit 34, a fault processing unit 36, and a synchronization (sync) processing unit 38 which are realized by software are provided for the middleware environment 26 included in the fixed function unit 22. The initialization processing unit 32 has previously been provided for the apparatus 12 itself in a manner similar to the network connecting unit 30 of the hardware environment 25. However, with respect to the fault detecting unit 34, the fault processing unit 36, and the sync processing unit 38, when the apparatus 12 is assembled into the high reliability system in FIGS. 1A and 1B, the software for synchronization is distributed from either the apparatus 12-10 or 12-11 which functions as a software distributing apparatus and is included in the pair 14-5 and its function is constructed.

Such a construction of the functions of the fault detecting unit 34, the fault processing unit 36, and the sync processing unit 38 by the initialization processing unit 32 by the distribution of the software for synchronization is a function which is used when a specific apparatus fails and the failed apparatus is exchanged to a new apparatus after the high reliability system 10 shown in FIGS. 1A and 1B was constructed. Naturally, at the time of the operation for constructing the high reliability system 10, if the apparatus 12-10 or 12-11 which distributes the software for synchronization is provided on the system and the other apparatuses are connected to the hub 16 for internal communication, by making a software distributing request to the apparatus 12-10 or 12-11, the software for synchronization is distributed, and each function of the middleware environment 26 in FIG. 2 can be constructed as an initializing process. A service processing unit 42 is provided for an application environment 28 of the apparatus 12. The service processing unit 42 receives distribution of an application program and constructs the service processes peculiar to the apparatus 12. The same service processing unit 42 is provided for the apparatuses which pair.

The sync processing unit 38 provided for the middleware environment 26 has synchronization (sync) destination parameters 40. A management table and a pair table, which will be clearly explained hereinafter, are used as sync destination parameters 40. The sync processing unit 38 executes the same service processes synchronously with the pair partner apparatus which is defined by the sync destination parameters 40. As a processing function of the sync processing unit 38, for example, a synchronizing process disclosed in JP-A-2001-523855 can be applied. That is, the sync processing unit 38 allows the service processing unit 42 to execute the processes synchronously with the pair partner apparatus which pairs.

The fault detecting unit 34 detects a fault of the pair partner apparatus and notifies the sync processing unit 38 and the fault processing unit 36 of it. Specifically, in the failed pair partner apparatus, the sync processing unit 38 disconnects a communication node to the internal network 15 for making communication between the apparatuses on the basis of the failure detection. Therefore, the communication for the synchronizing process through the internal network 15 is stopped, so that the fault of the pair partner destination can be detected. When the fault of the pair partner apparatus is detected by the fault detecting unit 34, the fault processing unit 36 issues the pair request to the internal network 15 and reconstructs a new apparatus pair together with the apparatus to which the pair application has been made in response to the pair request. In this case, as an apparatus which makes the pair application response to the pair request to the internal network 15, the spare apparatus responds in principle. However, the simple vacant apparatus to which the spare apparatus is not allocated can also respond.

If there are pair applications from a plurality of apparatuses in response to the issuance of the pair request to the internal network 15 by the fault processing unit 36, the redundant vacant apparatus other than the spare apparatus is preferentially selected and the apparatus pair is reconstructed. If there is no application from the vacant apparatus, the spare apparatus is selected and the apparatus pair is reconstructed. When the pair partner destination is determined in response to the pair application, the software for realizing the functions of the service processing unit 42 of the apparatus 12 which made the pair request and the processing data at the present point of time are transferred and copied to the pair partner destination through the internal network 15, thereby constructing the same service processing unit 42 into the variable function unit 24 in the apparatus of the pair partner destination and shifting it to the synchronizing process.

When the partner apparatus which pairs in the system fails, owing to the function of the fault processing unit 36, the apparatus which lost the pair partner destination issues the pair request to the internal network 15, determines a new pair partner destination, copies and transfers the same functions as those of the service processing unit 42, and constructs the same service processing unit 42, thereby shifting to the synchronizing process. The redundancy can be automatically recovered for the apparatus failure. With respect to the failed apparatus, the maintenance clerk exchanges it to a new apparatus after that. When the failed apparatus is exchanged to the new apparatus, the distributing request of the software for synchronization is issued to the internal network 15 by the initialization processing unit 32. In response to such a request, the software for synchronization is distributed to the exchanged apparatus from the apparatus 12-10 or 12-11 to which the function as a synchronizing software distributing apparatus in FIGS. 1A and 1B has been allocated, thereby constructing the fault detecting unit 34, the fault processing unit 36, and the sync processing unit 38 into the fixed function unit 22. Subsequently, the fault processing unit 36 of the new exchanged apparatus issues the pair request functioning as a spare adding notification to the internal network 15. In response to the pair request, the fault processing unit 36 receives the pair application from the other spare apparatus which does not pair at present and reconstructs a pair as spare apparatuses.

The apparatuses 12-0 to 12-11 in FIGS. 1A and 1B are realized by, for example, hardware resources of a computer as shown in FIG. 3. In the computer in FIG. 3, a RAM 102, a hard disk controller (software) 104, a floppy disk driver (software) 110, a CD-ROM driver (software) 114, a mouse controller 118, a keyboard controller 122, a display controller 126, and a board 130 for communication are connected to a bus 101 of a CPU 100, respectively. A hard disk drive (HDD) 106 is connected to the hard disk controller 104. Programs for executing the middleware environment and the application environment of the invention have been loaded in the hard disk drive 106. When the computer is activated, the necessary program is read out from the hard disk drive 106, developed into the RAM 102, and executed by the CPU 100. A floppy disk drive (hardware) (FDD) 112 is connected to the floppy disk driver 110 and can execute the reading and writing operations from/to a floppy disk (registered trademark). A CD driver (hardware) 116 is connected to the CD-ROM driver 114 and can read out data and programs stored in a CD. The mouse controller 118 transfers the inputting operation of a mouse 120 to the CPU 100. The keyboard controller 122 transfers the inputting operation of a keyboard 124 to the CPU 100. The display controller 126 allows a display unit 128 to display. The communicating board 130 makes communication with the apparatus in the internal network or the apparatus on the external network by using a communication line 132 including wireless means.

FIGS. 4A and 4B are explanatory diagrams of a management table and a pair table including the sync destination parameters 40 provided in the sync processing unit 38 of the apparatus 12 of the invention shown in FIG. 2. FIG. 4A shows a management table 46 having apparatus numbers, communication identifiers constructed by pair numbers and hub numbers, spare flags, and failure flags. Although a table structure in which those elements are collected for each of the apparatus numbers #00 to #11 is shown, all of the apparatuses 12-0 to 12-11 can hold the management table 46 or the self apparatus can also have only table information corresponding to its own apparatus number.

In the management table 46 regarding the high reliability system 10 in FIGS. 1A and 1B as a target, now assuming that the pair number is set to "n", the apparatus numbers of two apparatuses having the pair number "n" are defined as (2n, 2n+1). For example, in the case of the pair number "n=00", (2n, 2n+1)=(2×00, 2×00+1)=(0, 1). The apparatus numbers #00 and #01 have the same pair number "00". This is true of the residual pair numbers "01" to "05". The hub numbers are the numbers allocated to the hubs 18-1 and 18-2 for external communication in FIGS. 1A and 1B. For example, the hub 18-1 has the hub number "1" and the hub 18-2 has the hub number "2". The communication identifiers for the synchronizing process via the hub 16 constructing the internal network 15 have been allocated to the apparatuses 12-0 to 12-11 in FIGS. 1A and 1B. In the invention, each communication identifier includes the pair number and the hub number shown in the management table 46 in FIG. 4A. For example, the communication identifier has a length of 8 bits as a binary expression, lower one bit indicates the hub number, that is, the even number "2" or the odd number of "1", and upper 7 bits indicate the pair number.

The following expansion formats can be used as a construction of such a communication identifier.

(1) A value in which upper 4 bits indicate the pair number and a remainder of a value obtained by dividing a value of lower 4 bits by the total number of hubs (hexadecimal) indicates the hub number is inserted.

(2) Two hub groups of the communication identifiers (0 to 128) and (129 to 255) are expressed by upper one bit.

(3) 16 hub groups of the communication identifiers (0 to 15), (16 to 31), . . . , and (240 to 255) are expressed by upper 4 bits.

FIG. 4B is an explanatory diagram of a pair table 48. The pair apparatus numbers have been stored in this table in correspondence to the pair numbers. From the management table 46 and the pair table 48 as mentioned above, the apparatus itself can recognize the pair number of the pair to which the self apparatus belongs in correspondence to the number of the self apparatus and recognize the apparatus number of the pair partner apparatus. Whether the self apparatus is the spare apparatus or not can be recognized by the spare flag. Further, the presence or absence of the failed apparatus can be recognized by the failure flag. Contents in such management table 46 and pair table 48 are updated when a new apparatus pair is reconstructed by a redundancy recovery process in association with the apparatus failure and, further, when the failed apparatus is exchanged to a new apparatus.

Figure 5B:
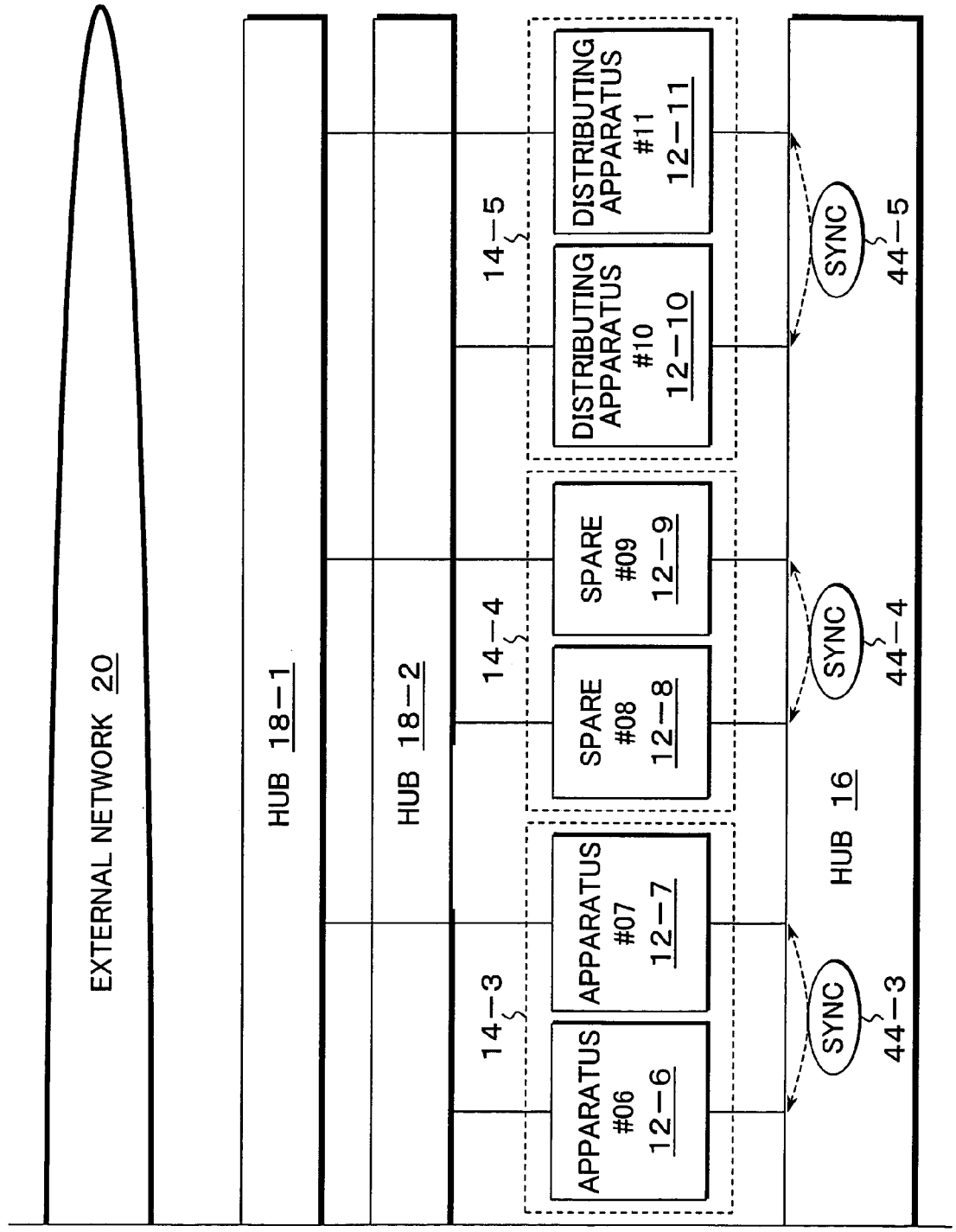

FIGS. 5A and 5B are explanatory diagrams of the synchronizing process during the system operation in the high reliability system of the invention. In FIGS. 5A and 5B, the high reliability system 10 makes synchronous communication 44-0 to 44-5 between the two apparatuses included in the pairs 14-0 to 14-5 through the hub 16 as an internal network as shown in the management table 46 in FIG. 4A and the pair table 48 in FIG. 4B, respectively.

Figure 6:
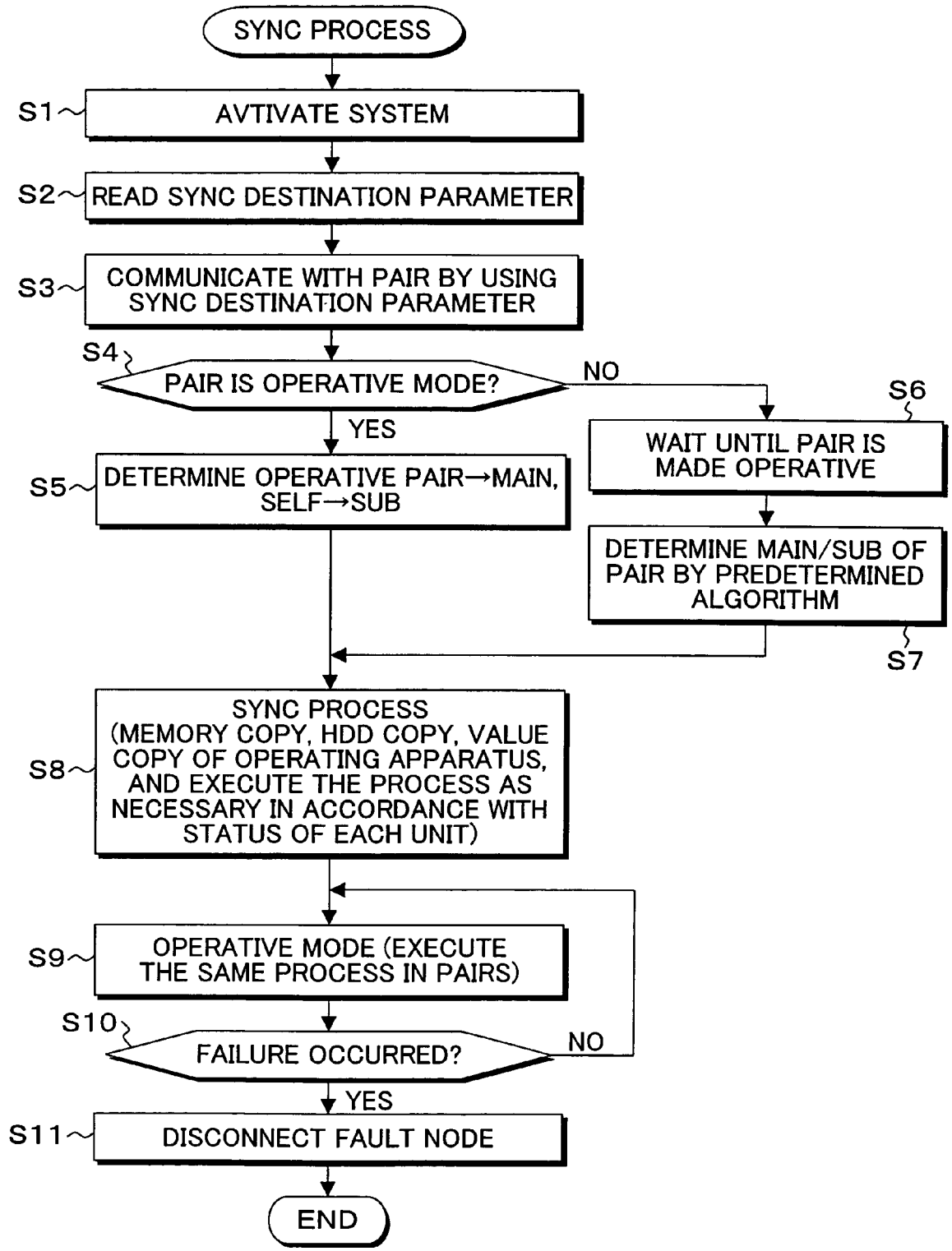
FIG. 6 is a flowchart for the synchronizing process in the apparatus of the invention.

FIG. 6 is a flowchart for the synchronizing process which is executed in each of the apparatuses 12-0 to 12-11 of the high reliability system 10 in FIGS. 5A and 5B and processes are executed by the following processing procedure.

Step S1: The system is activated.

Step S2: The sync destination parameters are read out and the pair partner apparatus is recognized.

Step S3: The communication with the pair partner apparatus is made by using the sync destination parameters.

Step S4: Whether the pair partner apparatus is in the operative mode or not is discriminated. If it is in the operative mode, step S5 follows. If it is not in the operative mode, step S6 follows.

Step S5: Since the pair partner apparatus is in the operative mode, the pair partner apparatus which has already been operating is determined to be a main apparatus and the self apparatus is determined to be a sub apparatus.

Step S6: Since the pair partner apparatus is not operating, the self apparatus waits until the pair partner apparatus is made operative.

Step S7: Between the self apparatus and the pair partner apparatus which has been made operative, the main apparatus and the sub apparatus of the pair are determined by a predetermined algorithm. As such a predetermined algorithm, the apparatus in which the number of fails is smaller and a failure history is smaller is determined to be "main" and the other apparatus is determined to be "sub" in consideration of the presence or absence of the failure, a past failure history, and the like.

Step S8: After the main/sub relation is determined, the synchronizing process is executed together with the pair partner apparatus. After a memory, copy, an HDD copy, and a value copy of an arithmetic operating apparatus are executed, the synchronizing process is executed in accordance with a state of each portion as necessary.

Step S9: Since the pair partner apparatus is in the operative mode, the same service processes are executed by the pair apparatuses.

Step S10: The presence or absence of the occurrence of a failure is detected in the operative mode and if the failure occurs, step S11 follows.

Step S11: On the basis of the occurrence of the failure, a failed node is disconnected and removed from the internal network.

FIGS. 7A and 7B are explanatory diagrams of a redundancy recovery process in the case where the apparatus 12-1 included in the pair 14-0 fails in the high reliability system 10 of the invention. With respect to the failure of the apparatus 12-1 as shown in FIGS. 7A and 7B, as shown in time charts of FIGS. 8A and 8B, the redundancy recovery process is executed between the failed apparatus 12-1, the apparatus 12-0 which pairs with the failed apparatus 12-1, and the apparatuses 12-8 and 12-9 to which the spare apparatuses have been allocated as a pair 14-4.

Figure 8B:
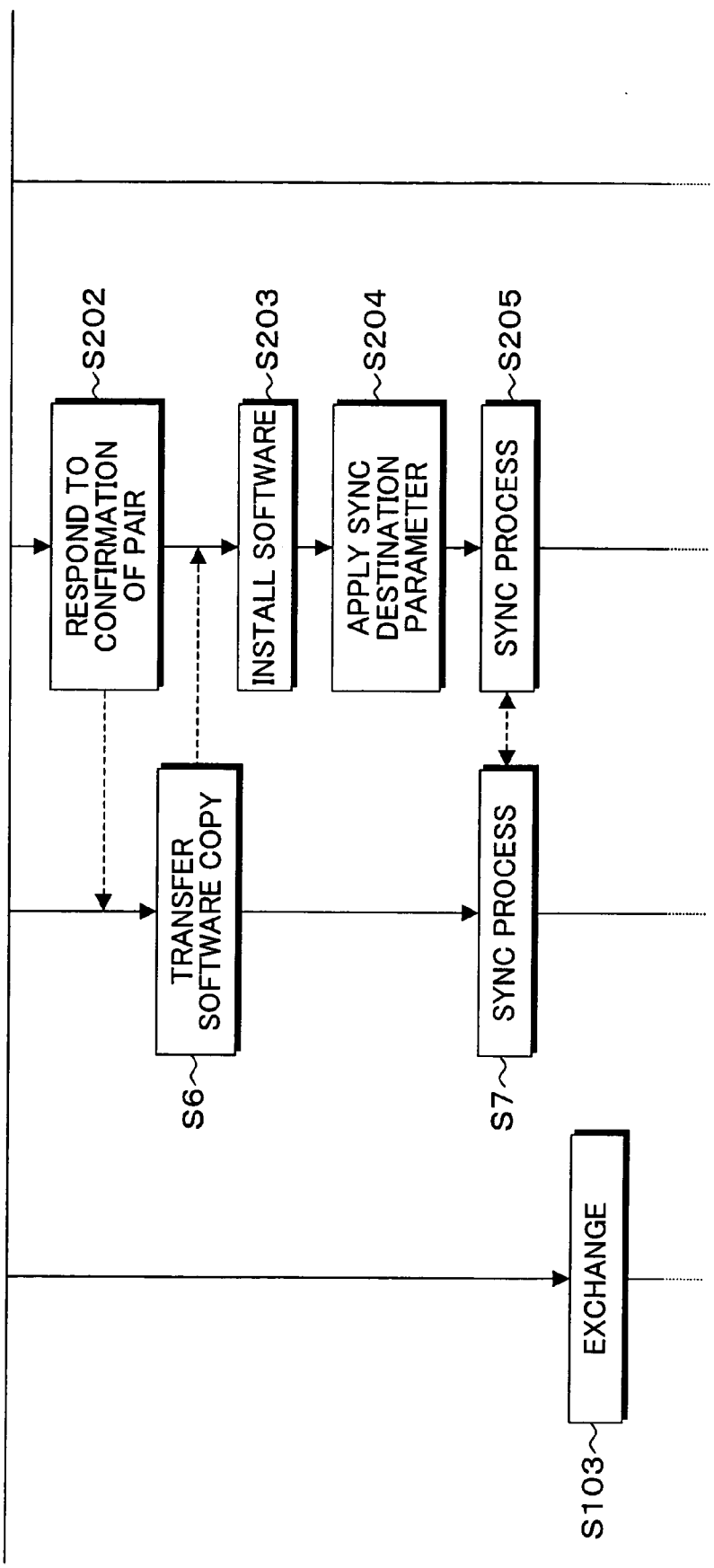

In FIGS. 8A and 8B, the apparatuses 12-0 and 12-1 constructing the pair 14-0 execute the synchronizing process while making synchronous communication in each of steps S1 and S101, thereby realizing the redundancy of the service processes which are provided by the apparatuses 12-0 and 12-1. Assuming that the apparatus 12-1 failed in step S102 in the state of the synchronizing process, the apparatus 12-0 as a pair partner destination detects it in step S2 and issues a pair request 50 to the hub 16 as an internal network as shown in FIGS. 7A and 7B in step S3. The pair request 50 from the apparatus 12-0 is received by all of the other apparatuses through the hub 16 as an internal network. The pair request 50 is communication data in which a command showing the pair request is included in the communication identifier of the apparatus 12-0 serving as a communicating source.

In response to the pair request from the apparatus 12-0, in the case of FIGS. 7A and 7B, the apparatuses 12-8 and 12-9 to which the spare apparatuses have been allocated and which are included in the pair 14-4 make a response of the pair application as shown in steps S201 and S301. This pair application is communication data in which a pair applying command is included in the communication identifiers of the apparatuses 12-8 and 12-9. The apparatus 12-0 which made the pair request receives the pair applications from the apparatuses 12-8 and 12-9 to which the spare apparatuses have been allocated and selects the pair in step S4. The pair selection is determined in accordance with rules 1 to 5 defined in a rule table 54 in FIG. 9. In this case, the spare apparatus 12-9 is selected.

When the spare apparatus 12-9 is selected as a pair apparatus in step S4, the selected spare apparatus 12-9 is notified of the pair decision in step S5. In response to it, the apparatus 12-9 which received the decision notification makes the pair confirmation response in step S202. Thus, the apparatus 12-0 which lost the pair partner apparatus by the failure newly obtains the apparatus 12-9 as a pair partner apparatus. Subsequently, the apparatus 12-0 reads out the software of the service processing unit for giving redundancy of the functions of the service processing unit from the HDD in step S6, at the same time, reads out the data obtained in the service processes at a present point of time, and transfers them to the apparatus 12-9 which became the new pair partner destination for copying. The apparatus 12-9 receives the copy transfer of the software from the apparatus 12-0 and installs the software in step S203. Further, the apparatus 12-9 applies the parameters showing the pair partner apparatus 12-0 which became the synchronization destination in step S204. The apparatuses 12-0 and 12-9 start the synchronizing process in steps S7 and S205. Thus, the redundancy of the service processes which have been executed by the apparatus 12-0 is automatically recovered. With respect to the failed apparatus 12-1, the failure notification is liaised with the maintenance clerk or the like and, thereafter, the apparatus 12-1 is exchanged to a new apparatus in step S103.

FIG. 9 is an explanatory diagram of the rule table 54 in which the rules for pair selection which is executed in step S4 of the apparatus 12-0 in FIGS. 8A and 8B have been defined. In the rule table 54, the rules 1, 2, 3, 4, and 5 are defined and the pair partner destination is selected in accordance with the order of the rule numbers. In the pair selection based on the rules 1 to 5, the pair number and the hub number which construct the communication identifier are used as a base and, further, history information with the pair partner apparatus is used.

Rule 1:
The apparatus having the same pair number as and the different hub number from those of the apparatus which made the pair request and, further, having the same pair number and hub number as those of the latest pair partner, that is, the same communication identifier is selected as a pair partner.

Rule 2:
The apparatus which satisfies only the two conditions of the former half of Rule 1, that is, the apparatus having the same pair number as and the different hub number from those of the apparatus which made the pair request is selected as a pair partner.

Rule 3:
The apparatus having the different pair number and hub number from those of the apparatus which made the pair request and, further, having the same pair number and hub number as those of the latest pair partner, that is, the same communication identifier is selected as a pair partner.

Rule 4:
The apparatus which satisfies only the two conditions of the former half of Rule 3, that is, the apparatus having the different pair number and hub number from those of the apparatus which made the pair request is selected as a pair partner apparatus.

Rule 5:
The apparatus having the different pair number from and the same hub number as those of the apparatus which made the pair request is selected as a pair partner apparatus.

FIGS. 10A, 10B, and 10C are diagrams of a specific example of the pair selecting process based on the rule table 54 in FIG. 9 in the case where, in FIGS. 7A and 7B, the apparatus 12-1 failed and the apparatus 12-0 made the pair request 50 and received the pair applications from the apparatuses 12-8 and 12-9 to which the spare apparatuses have been allocated. That is, FIG. 10A shows the apparatus number, pair number, and hub number of the failed apparatus 12-1 and FIG. 10B shows the apparatus number, pair number, and hub number of the apparatus 12-0 which makes the pair request.

Rules 1 to 5 in the rule table 54 in FIG. 9 are specifically applied as follows. First, when Rule 1 is applied, there are the following relations between the pair number and the hub number of the apparatus 12-1 which made the pair request in FIG. 10B.

(1) The same hub number=00
(2) The different hub number=1
(3) The same pair number and hub number as those of the latest pair partner=00, 1

The communication identifier of the pair partner in this case is equal to "001" and it will be understood from the management table 46 in FIG. 4A that the pair partner is the apparatus 12-1 of the apparatus number #01. However, since this apparatus is the failed apparatus, no candidate exists. Subsequently, Rule 2 is applied. Also in this case, the communication identifier of the pair partner destination is equal to "001" and the pair partner is the apparatus 12-1, so that no candidate exists. Subsequently, by Rule 3, the apparatus of the same pair number and hub number serving as the latest pair partner is selected from the apparatuses 12-3, 12-5, 12-7, 12-9, and 12-11 having the communication identifiers "011", "021", "031", "041", and "051" each having the different pair number and hub number. However, the candidate corresponding to such an apparatus does not exist.

Subsequently, the apparatuses 12-3, 12-5, 12-7, 12-9, and 12-11 having the same communication identifiers as those in Rule 3 are selected by Rule 4. Since the apparatus 12-9 allocated as a spare apparatus which responded to the pair application is included among those apparatuses, the apparatus 12-9 allocated as a spare apparatus is selected as a pair partner destination by Rule 4. If the apparatus 12-9 as a spare does not apply for the pair, the apparatus 12-8 allocated as a spare apparatus is selected by Rule 5.

FIGS. 11A and 11B are explanatory diagrams of a management table and a pair table which are changed in the redundancy recovery process in FIGS. 7A and 7B. First, in the management table 46 in FIG. 11A, since the apparatus 12-1 of the apparatus number #01 has failed, the failure flag is set from 0 to 1. The apparatus 12-0 selects the apparatus 12-9 of the apparatus number #09 as a pair partner destination in place of the failed apparatus 12-1, shifts to the synchronizing process, and recovers the redundancy. Therefore, the pair number of the apparatus number #09 is changed from the pair number "04" so far to the pair number "00". At the same time, the spare flag is reset from 1 to 0. With respect to the pair table 48 in FIG. 11B, the apparatus number #01 included in the pair number "00" is changed to the new apparatus number #07 due to the failure. At the same time, the pair apparatus number #09 in the pair number "04" is deleted, the redundancy of the spare apparatus is cancelled, and the sole spare apparatus is used.

FIGS. 12A and 12B are explanatory diagrams of the redundancy recovery process in the case where the failed apparatus is exchanged after the apparatus failed and the redundancy is automatically recovered. In FIGS. 12A and 12B, the failed apparatus 12-1 is removed from the high reliability system and a new apparatus 12-1a is connected to the system and activated by turning on a power source, or the like. The redundancy recovery process in the case where the failed apparatus is exchanged as mentioned above is executed in accordance with a procedure shown in a time chart of FIG. 13.

Figure 13:
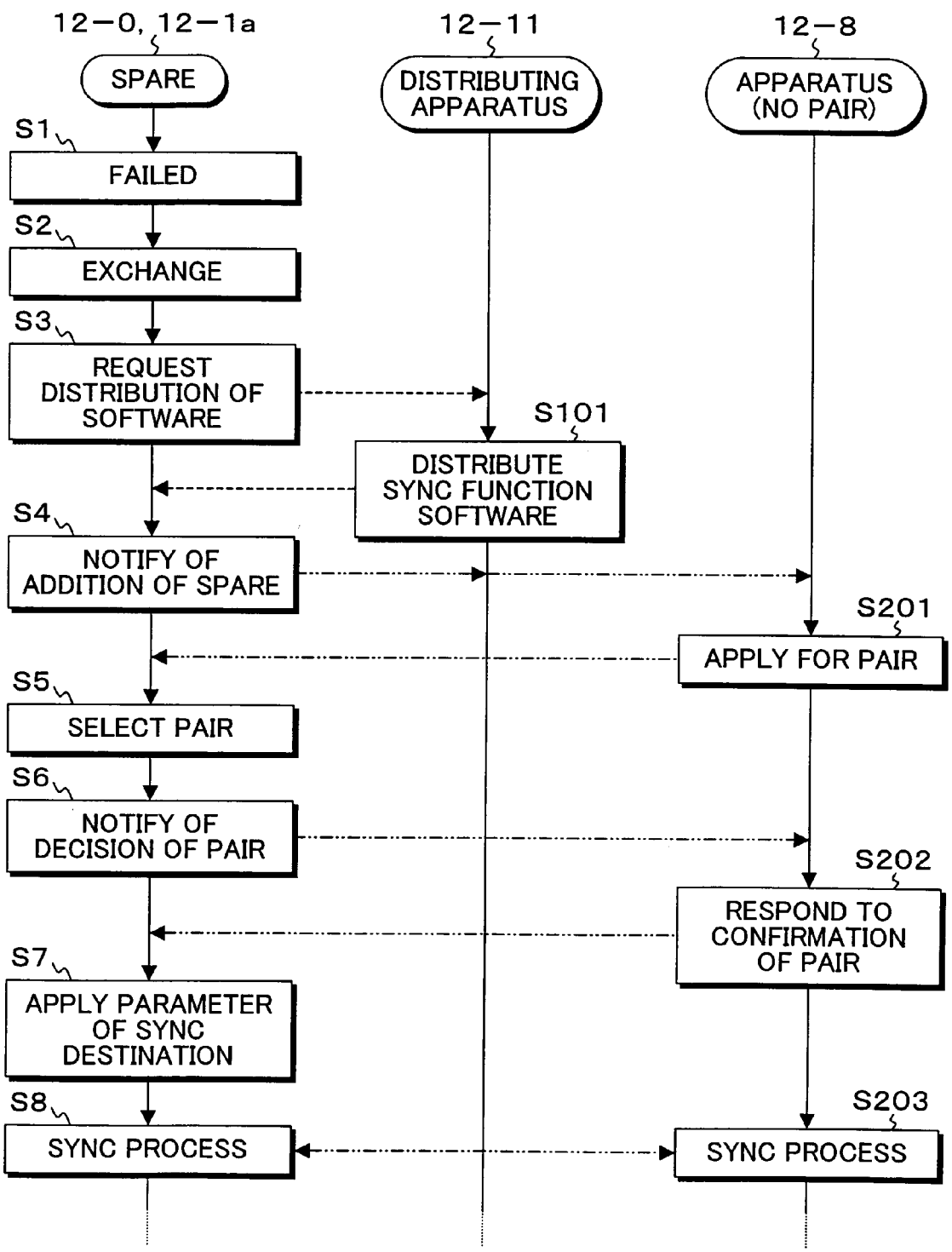
FIG. 13 is a time chart for the redundancy recovery process in the apparatus exchange in FIGS. 12A and 12B.

FIG. 13 shows processes which are executed among the failed apparatus 12-1, the distributing apparatus 12-11 which distributes the software for synchronization, and the apparatus 12-8 as a spare apparatus which exists without a pair. First, in the apparatus 12-1, it fails in step S1 and, thereafter, is exchanged to the new apparatus 12-1a as shown in FIGS. 12A and 12B in step S2. The exchanged apparatus 12-1a does not have the service processing unit 42 in the variable function unit 24 and the fault detecting unit 34, the fault processing unit 36, and the sync processing unit 38 in the middleware environment 26 in the fixed function unit 22 in the apparatus 12 shown in FIG. 2. The exchanged apparatus 12-1a comprises only the initialization processing unit 32 and the network connecting unit 30 of the hardware environment 25.

Therefore, the exchanged apparatus 12-1a issues a distributing request 60 of the software for synchronization to the hub 16 as an internal network as shown in FIGS. 12A and 12B in step S3 by the initialization processing unit 32 shown in FIG. 2. The distributing request 60 is sent to the distributing apparatuses 12-10 and 12-11 included in the pair 14-5 through the hub 16. For example, by the synchronizing process, the distributing apparatus 12-11 determined as a main apparatus reads out the software for synchronization stored in the HDD or the like by itself in step S101 and distributes the software to the apparatus 12-1a of a requesting source. Thus, the software for synchronization is installed into the exchanged apparatus 12-1a and the functions of the fault detecting unit 34, the fault processing unit 36, and the sync processing unit 38 having the sync destination parameters 40 in the middleware environment 26 in FIG. 2 are constructed. Therefore, the exchanged apparatus 12-1a issues a spare adding notification showing that the self apparatus has been added as a spare to the system to the internal network in step S4.

The spare adding notification is the same as the pair request in step S3 of the apparatus 12-0 shown in FIGS. 8A and 8B. Communication data in which a pair request command has been added to the communication identifier of the apparatus 12-1a is transmitted to the internal network. In response to the spare adding notification having the contents as a pair request, the apparatus 12-8 which has no pair at present and is in the non-redundant state and to which the spare apparatus has been allocated makes the pair application response in step S201. By receiving the pair application response, the apparatus 12-1a selects the pair in step S5. With respect to the pair selection, Rules 1 to 5 in the rule table 54 in FIG. 9 are sequentially applied. Naturally, when the pair application is made only by the apparatus 12-8, the apparatus 12-8 is selected irrespective of the rules.

When the pair is selected in step S5, the apparatus 12-8 to which the pair application has been made is notified of the determination of the pair in step S6. In response to the notification, the apparatus 12-8 makes a pair confirmation response in step S202. By receiving the pair confirmation response, the apparatus 12-1a applies the pair partner apparatus 12-8 as a parameter of the sync destination side in step S7. The apparatuses 12-1a and 12-8 shift to the synchronizing process in steps S8 and S203, so that the redundancy of the spare apparatus which was lost by the apparatus failure is automatically recovered. Also with respect to the recovery of the redundancy of the spare apparatus, it is sufficient that the maintenance clerk merely exchanges the failed apparatus to a new apparatus and executes the activating operation. The manual operation can be simplified and finished in a short time.

FIGS. 14A and 14B are explanatory diagrams of a management table and a pair table which are changed as a result of the redundancy recovery process in FIGS. 12A and 12B. In the management table 46 in FIG. 14A, with respect to the apparatus number #01 of the failed apparatus, since the pair as a spare apparatus is established with the apparatus of the apparatus number #08, the pair number is changed from "00" to "04". At the same time, the spare flag is set from 0 to 1 and the failure flag is reset from 1 to 0. With respect to the pair table 48 in FIG. 14B, the pair apparatus number in the pair number "04" is changed from (#08, #**\*\*) so far to (#08, #01**) and it will be understood that the pair of the spare apparatuses has been reconstructed.

Figure 15:
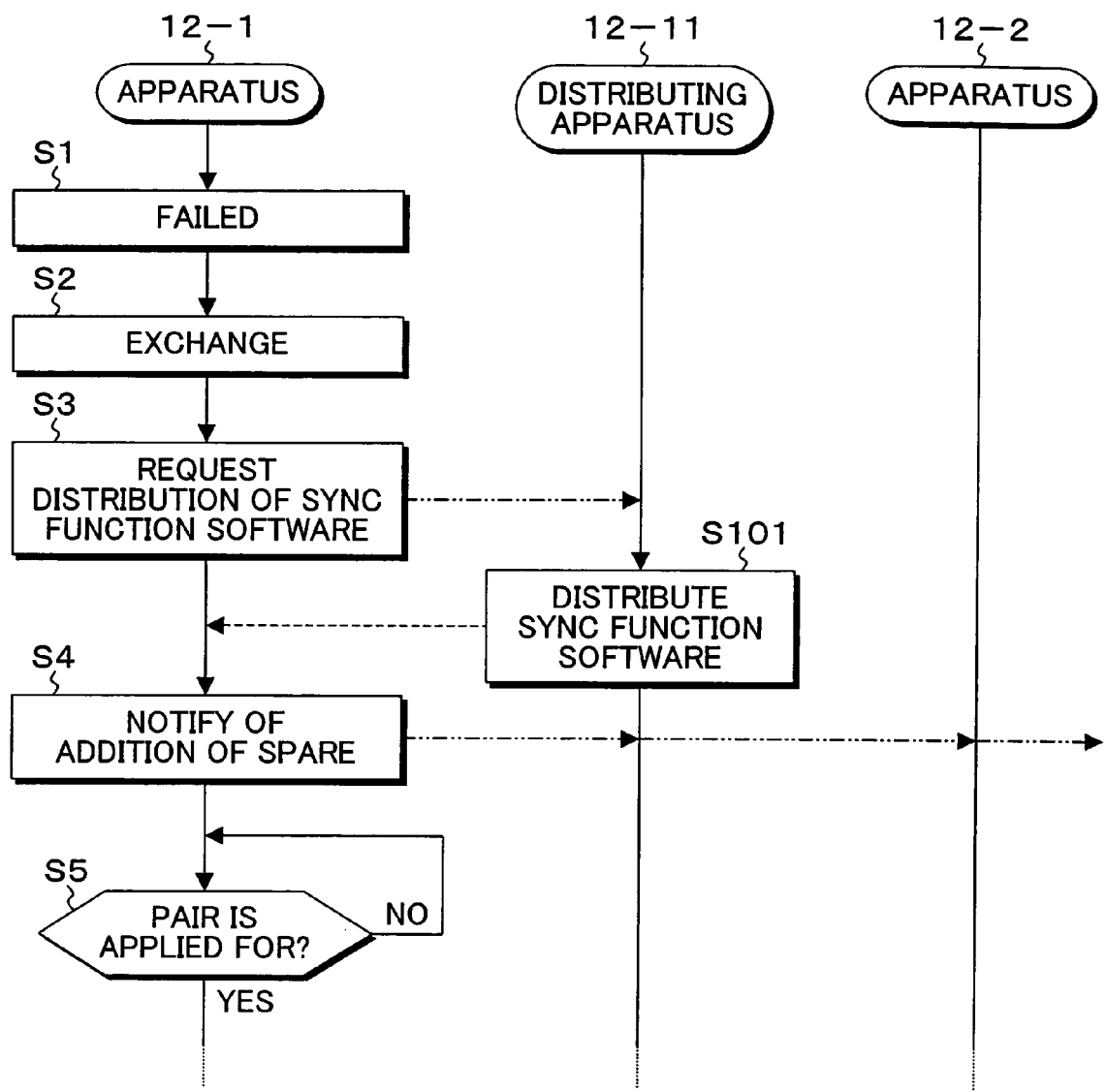
FIG. 15 is a time chart for a process to wait for a redundancy recovery in the case where no pair partner apparatus exists when the failed apparatus is exchanged.

FIG. 15 is a time chart for a process to wait for the redundancy recovery in the case where the partner destination of the pair does not exist when the failed apparatus is exchanged. The apparatus 12-1, the distributing apparatus 12-11, and the other apparatus 12-2 are shown. In this case, when the apparatus 12-1 fails in step S1 and, thereafter, is exchanged to a new apparatus in step S2 by the maintenance clerk, the distributing request of the software for synchronization is made in step S3 to the hub 16 as an internal network by the initialization processing unit 32 in FIG. 2 provided for the apparatus after the exchange.

On the other hand, the software for synchronization is distributed in step S101 by the apparatus 12-11 to which the function as a distributing apparatus has been allocated. By receiving the distribution, the software for synchronization is installed into the exchanged apparatus, so that the functions of the fault detecting unit 34, the fault processing unit 36, and the sync processing unit 38 shown in FIG. 2 are constructed. Subsequently, the apparatus 12-1 which received the installation by the distribution of the software for synchronization sends the spare adding notification as a pair request to the internal network in step S4. In this example, since the pair partner apparatus does not exist, the system enters a pair application waiting mode, that is, a redundancy recovery waiting mode in step S5.

Figure 16:
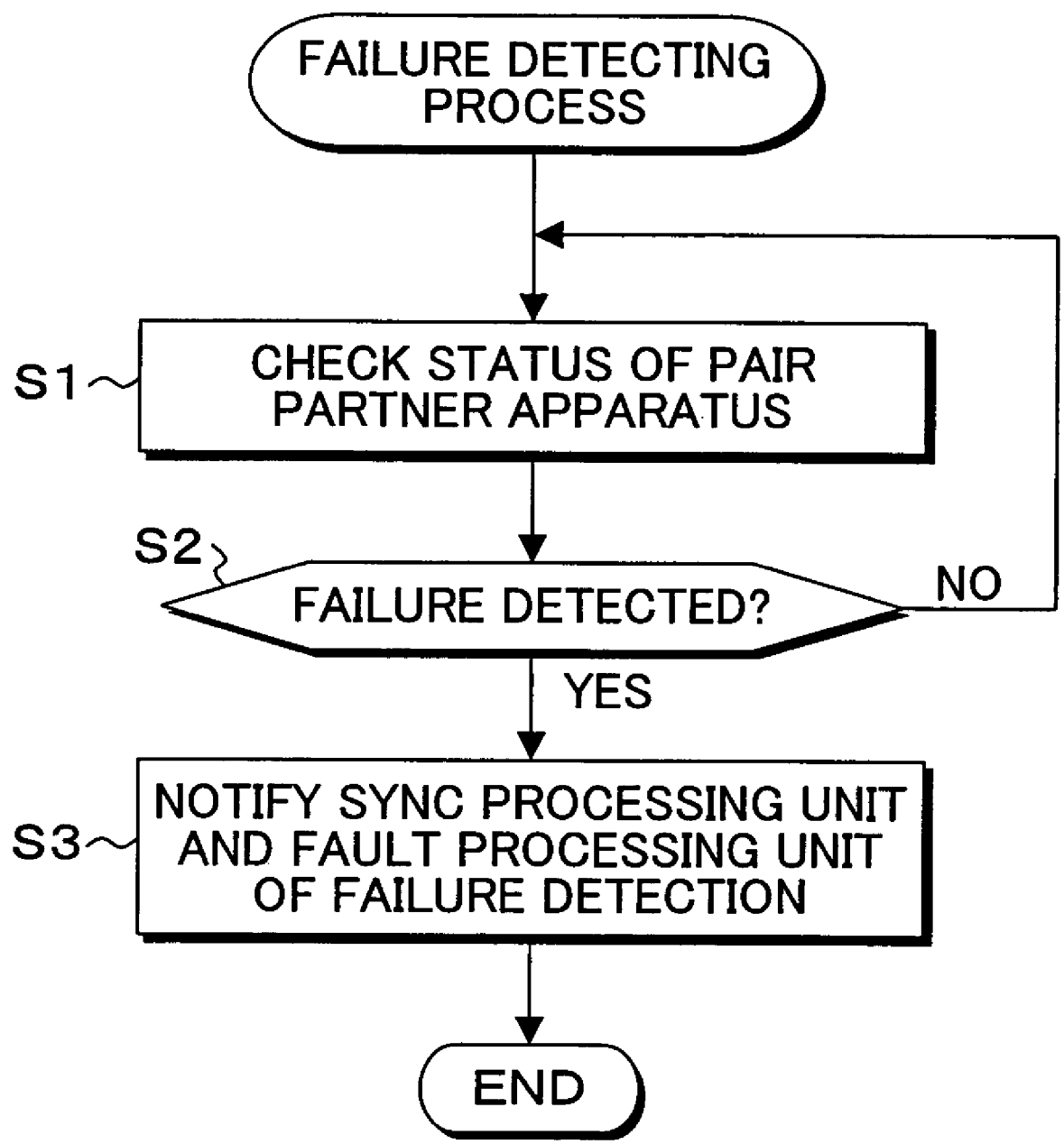
FIG. 16 is a flowchart for a failure detecting process in the apparatus of the invention.

FIG. 16 is a flowchart for a fault detecting process in the fault detecting unit 34 provided in the apparatus 12 in FIG. 2. Processes are executed in accordance with the following processing procedure.

Step S1: A status of the pair partner apparatus in the synchronizing process is checked.

Step S2: Whether the status is the failure detection or not is discriminated from the status. If it is not the failure detection, the processing routine is returned to step S1. If it is the failure detection, step S3 follows.

Step S3: The sync processing unit 38 and the fault processing unit 36 are notified of the failure detection, and the processing routine is finished.

Figure 17A:
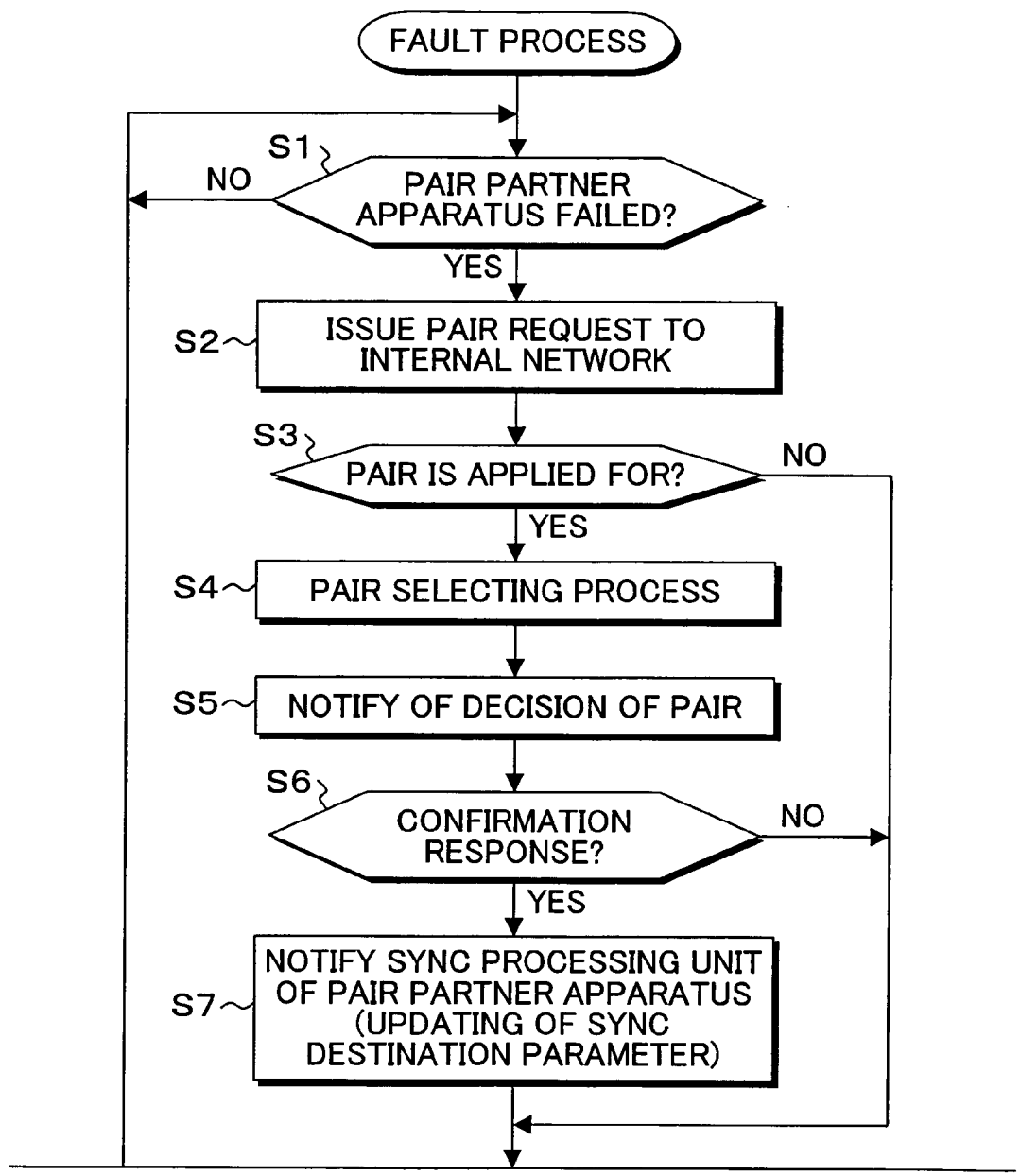
FIGS. 17A and 17B are flowcharts for a fault process in the apparatus of the invention.
Figure 17B:
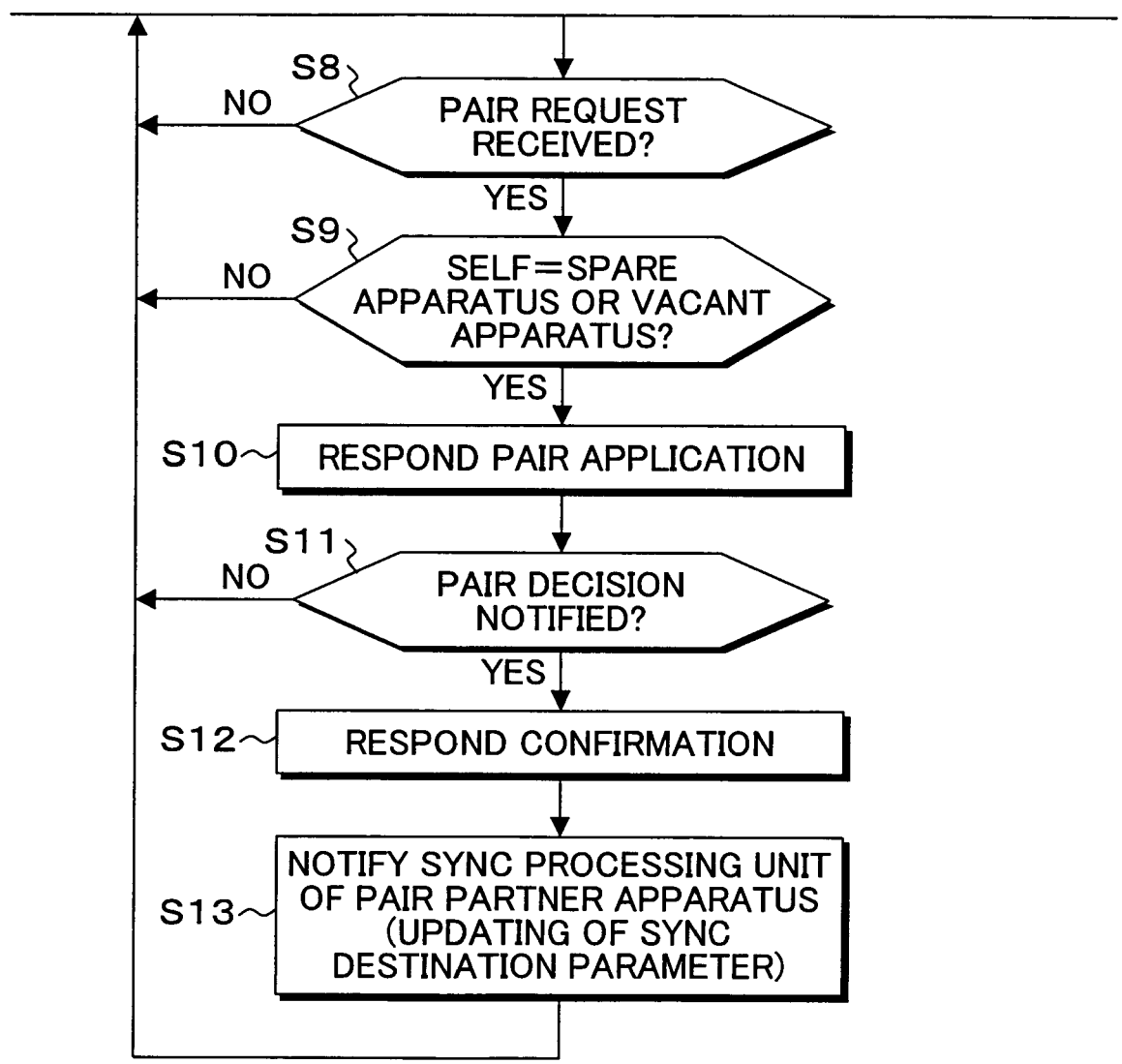

FIGS. 17A and 17B are flowcharts for a fault process by the fault processing unit 36 provided in the apparatus 12 in FIG. 2 and processes are executed in accordance with the following processing procedure.

Step S1: The presence or absence of a failure detection notification of the pair partner apparatus is discriminated. If the failure detection notification exists, step S2 follows.

Step S2: The pair request is issued to the internal network.

Step S3: The presence or absence of the pair application is discriminated. If the pair application exists, step S4 follows. If NO, step S8 follows.

Step S4: With respect to the pair partner destination to which the pair application has been made, a pair selecting process for selecting the pair partner destination apparatus is executed in accordance with, for example, the rule table 54 in FIG. 9.

Step S5: The pair decision notification is issued to the selected pair partner destination apparatus.

Step S6: The presence or absence of the confirmation response from the pair partner apparatus which has been notified of the pair decision is discriminated. If there is the confirmation response, step S7 follows. If NO, step S8 follows.

Step S7: The sync processing unit 38 is notified of the pair partner apparatus. That is, the sync destination parameters 40 are updated.

Step S8: Whether the pair request from another apparatus has been received or not is discriminated. If the pair request has been received, step S9 follows. If NO, the processing routine is returned to step S1.

Step S9: In response to the pair request, whether the self apparatus is the spare apparatus or the vacant apparatus is discriminated. If it is the spare apparatus or the vacant apparatus, step S10 follows. If NO, the processing routine is returned to step S1.

Step S10: The pair application is responded to the apparatus which made the pair request.

Step S11: In response to the pair application, the presence or absence of the pair decision notification is discriminated. If there is the pair decision notification, step S12 follows. If NO, the processing routine is returned to step S1.

Step S12: The confirmation is responded to the pair decision notification.

Step S13: The sync processing unit 38 is notified of the pair partner apparatus and the sync destination parameters 40 are updated.

Figure 18:
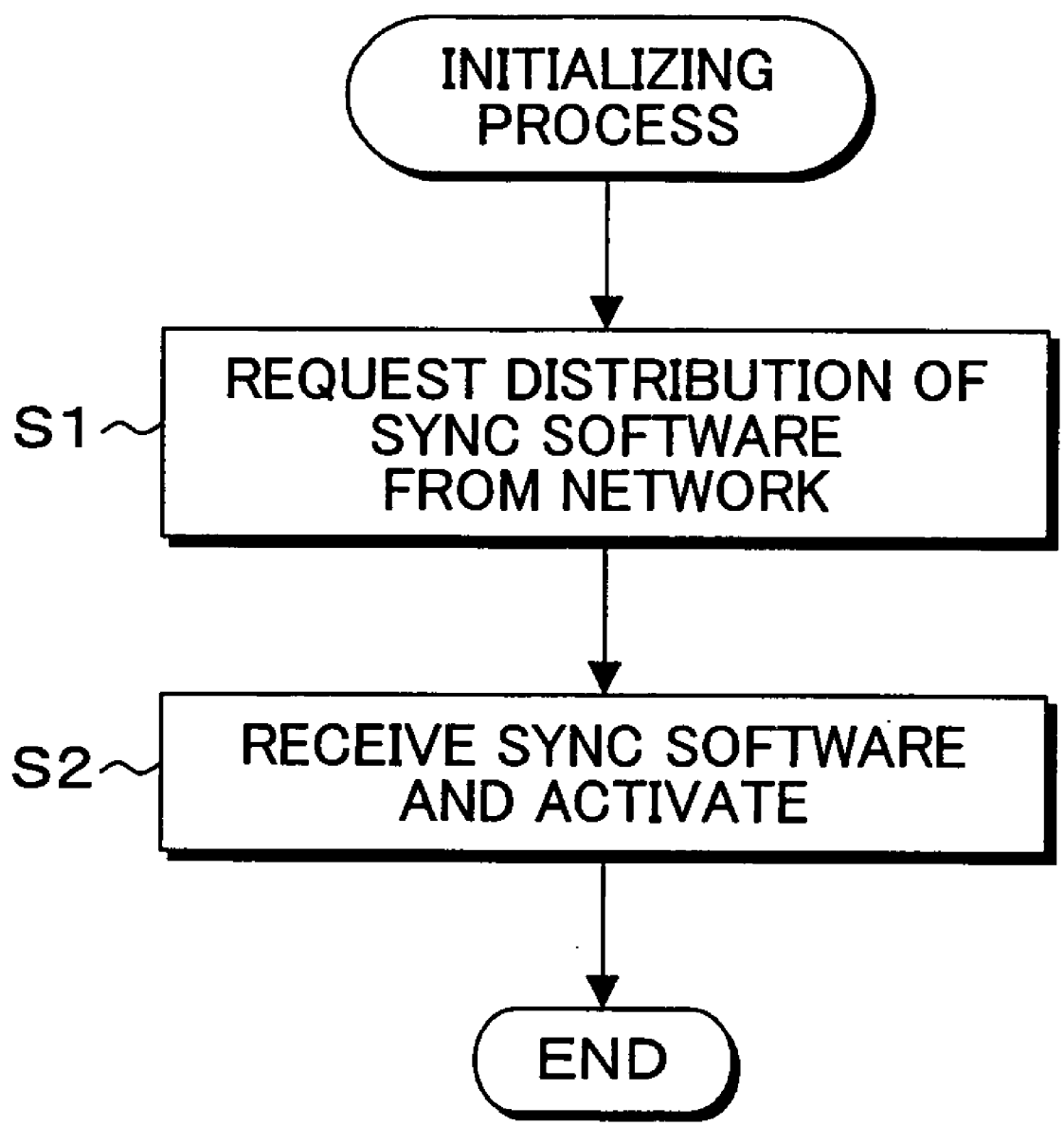
FIG. 18 is a flowchart for an initializing process in the apparatus of the invention.

FIG. 18 is a flowchart for an initializing process by the initialization processing unit 32 in the apparatus 12 in FIG. 2 and processes are executed in accordance with the following processing procedure.

Step S1: The distributing request of the software for synchronization is issued to the network.

Step S2: The software for synchronization is received and installed.

Figure 19A:
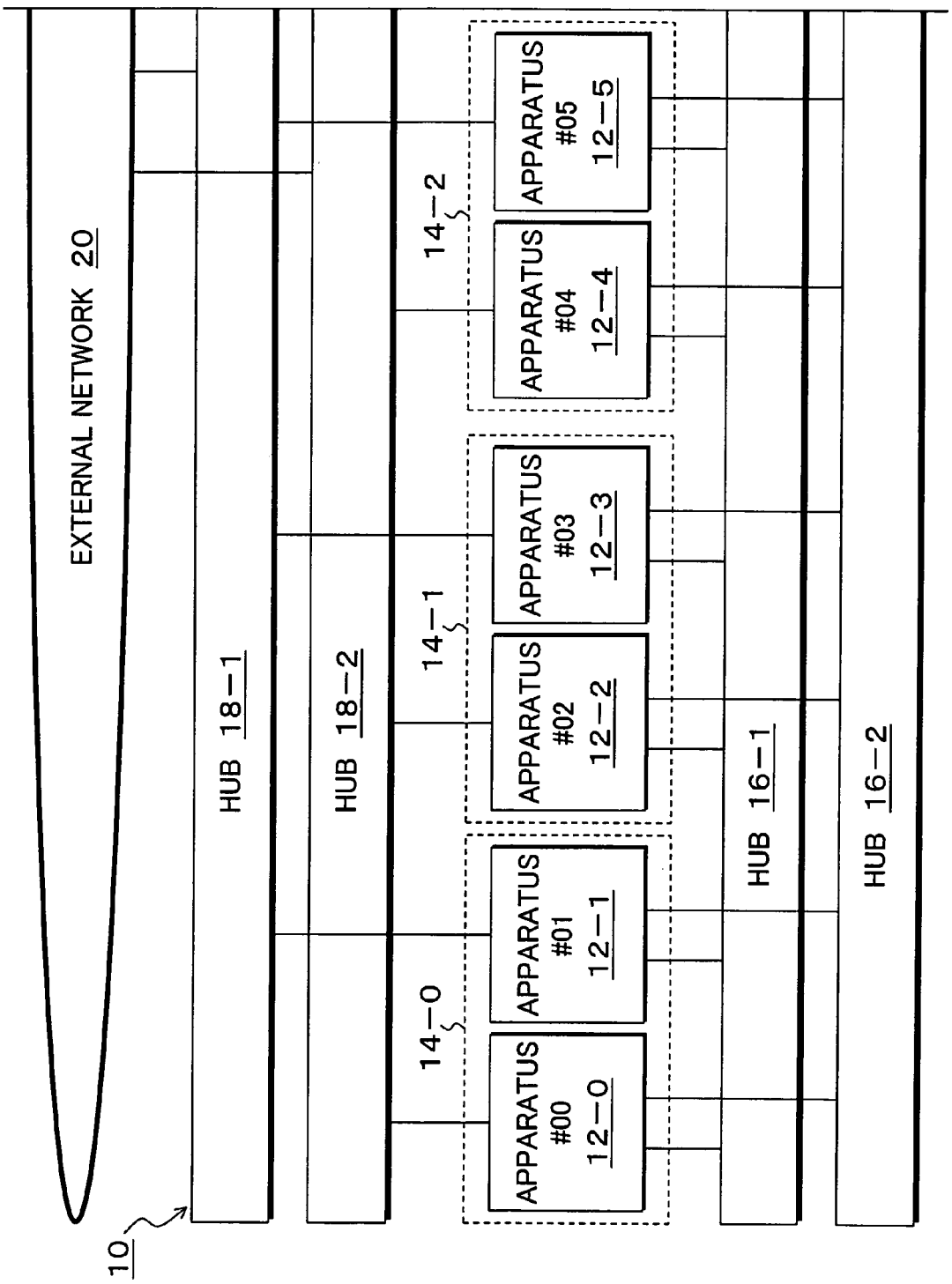
FIGS. 19A and 19B are explanatory diagrams of a high reliability system according to the invention in which a redundant of an internal network is given.
Figure 19B:
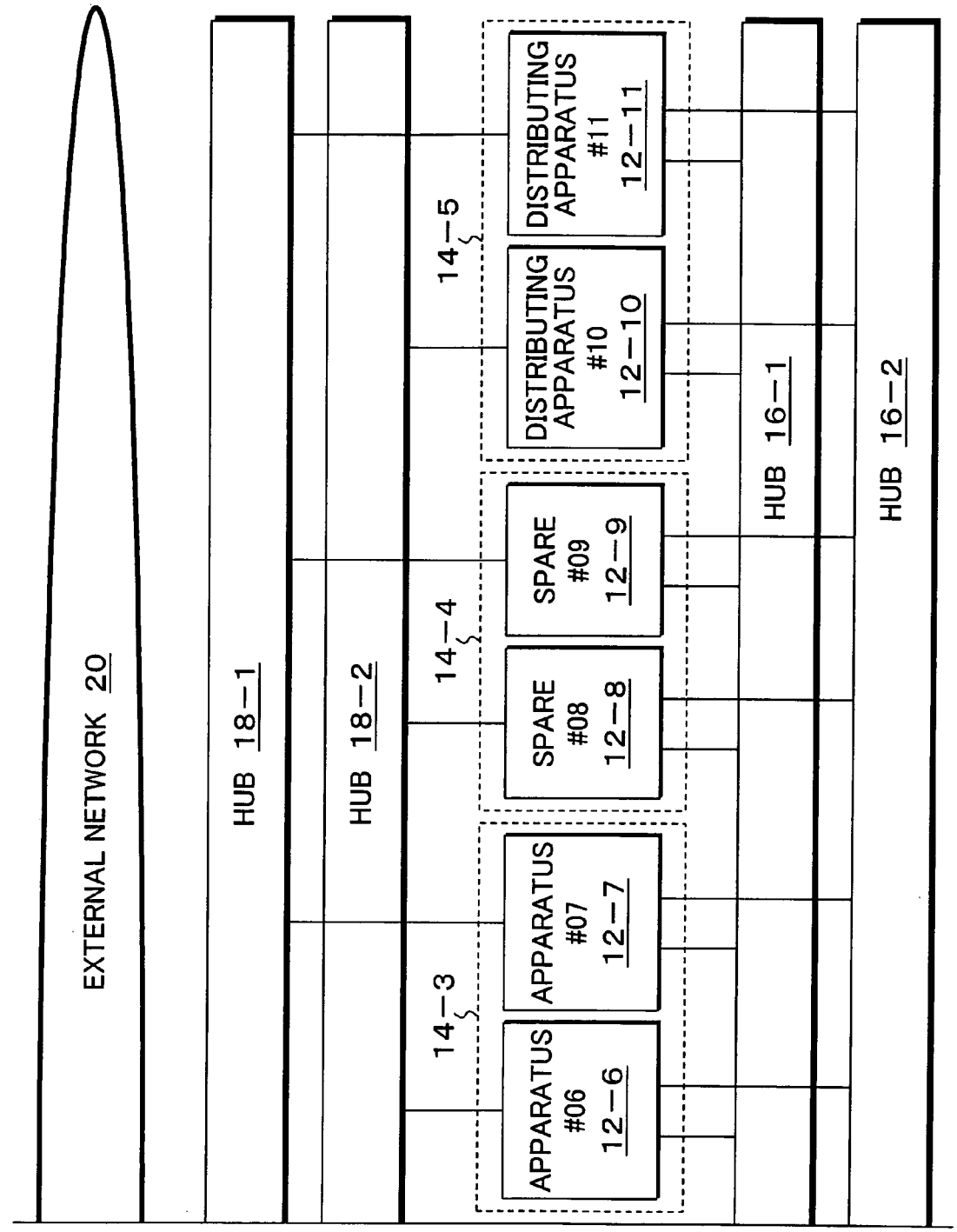

FIGS. 19A and 19B are explanatory diagrams of another embodiment of the high reliability system according to the invention in which a redundancy of the internal network is given. In FIGS. 19A and 19B, the high reliability system 10 according to the embodiment is characterized in that hubs 16-1 and 16-2 constructing the internal network are provided for the apparatuses 12-0 to 12-11 which construct the pairs 14-0 to 14-5, thereby also giving the redundancy with respect to the internal network. The apparatuses 12-0 to 12-11 are connected to the hubs 16-1 and 16-2 by communication ports, respectively. Even if a failure occurs in either the hub 16-1 or 16-2, the communication between the apparatuses can be assured by the redundancy.

In the embodiment of FIGS. 1A and 1B, a communication path of the internal network between the apparatuses is formed by only the hub 16, and on the communication path of the internal network, a communication path for the synchronizing process at the time of the operation, a communication path for the redundancy recovery process at the time of the apparatus failure, and a communication path for the redundancy recovery process when the failed apparatus is exchanged are formed. However, since those three communication paths do not simultaneously occur with respect to time, even in the case of the communication path by the same hub 16, the high-speed transfer which makes the most of transferring ability of the communication path can be realized. Therefore, even if the redundancy of the internal network side is given by the hubs 16-1 and 16-2 as shown in FIGS. 19A and 19B, since the communication speed is guaranteed by only the single hub, it is sufficient to use only the communication path of either the hub 16-1 or 16-2. However, if only one side of the hubs 16-1 and 16-2 is used, there is a problem on the reliability of the communication due to the assurance of the redundancy, it is desirable that the communication path which is used for the synchronizing process in the operative mode is allocated, for example, to the hub 16-1 with respect to the pairs 14-0, 14-2, and 14-4 and to the hub 16-2 with respect to the pairs 14-1, 14-3, and 14-5 and held in the using state during the operation of both of the hubs 16-1 and 16-2.

The above embodiment has been described with respect to the example of the failure in the apparatus which provides only the services peculiar to the apparatus. However, in addition to the services peculiar to the apparatus, also with respect to the failure of either the apparatus 12-10 or 12-11 having the function as a distributing apparatus which executes the distributing process of the software for synchronization, by deciding a new pair partner apparatus together with the spare apparatus by the pair request to the internal network from the distributing apparatus which lost the pair partner destination due to the failure, in this case, in addition to the software of the service processing unit, also with respect to the software for synchronization, by copying and transferring it to the pair partner destination apparatus which newly paired, even as an apparatus as a distributing apparatus of the software for synchronization, the redundancy can be automatically recovered for the apparatus failure.

The invention is not limited to the foregoing embodiment but incorporates many proper modifications without losing the advantages and objects of the invention. Further, the invention is not limited by the numerical values shown in the above embodiment.

What is claimed is:

1. A high reliability system in which a plurality of apparatuses are mutually connected through an internal network, apparatus pairs are constructed with respect to said plurality of apparatuses, and spare apparatuses are allocated, thereby giving redundancy, comprising:

said plurality of apparatuses respectively including:
a service processing unit which executes software for providing service peculiar to each apparatus pair through an external network;
a synchronization processing unit which synchronizes processes by said service processing unit between the apparatuses constructing the apparatus pair through the internal network;
a fault detecting unit which detects a fault of a pair partner apparatus; and
a fault processing unit which, when the fault of the pair partner apparatus is detected by said fault detecting unit, issues a pair request to the internal network and reconstructs the apparatus pair by substituting an apparatus to which a pair application has been made for the pair partner apparatus which detected the fault, and
wherein said synchronization processing unit manages a management table in which pair numbers showing the pairs in correspondence to apparatus numbers have been stored, recognizes the apparatus having the same pair number as that of the self apparatus in said management table as a pair partner apparatus, and executes the synchronizing process,
wherein said synchronization processing unit stores a hub number of a hub connected to the external network, a spare flag showing the spare apparatus, and a failure flag showing a failed apparatus into said management table in addition to the pair numbers corresponding to the apparatus numbers, and
when the pair applications are received from a plurality of processing apparatuses, said fault processing unit selects a new pair partner apparatus based on the pair number and the hub number in said management table and reconstructs the apparatus pair,
wherein when the pair applications are received from a plurality of apparatuses, said fault processing unit sequentially applies the following five rules and determines and reconstructs the pair partner apparatus:
a first rule by which the apparatus having the different hub number and the same pair number as those of the pair apparatus and having the same hub number and the same pair number as those of the apparatus which has been the latest pair is set to the pair partner apparatus;
a second rule by which the apparatus having the different hub number and the same pair number is set to the pair partner apparatus;
a third rule by which the apparatus having the different hub number and the different pair number as those of the pair apparatus and having the same hub number and the same pair number as those of the apparatus which has been the latest pair is set to the pair partner apparatus;
a fourth rule by which the apparatus having the different hub number and the different pair number is set to the pair partner apparatus; and
a fifth rule by which the apparatus having the same hub number and the different pair number is set to the pair partner apparatus.

2. A system according to claim 1, wherein said fault processing unit transfers and copies the software for realizing a function of said service processing unit and processing data to the pair partner apparatus through the internal network, thereby constructing the same service processing unit and shifting to the synchronizing process.

3. A system according to claim 1, wherein when the pair applications are received from a plurality of processing apparatuses, said fault processing unit preferentially selects a vacant apparatus other than the spare apparatuses and reconstructs the apparatus pair, and when there is no application from said vacant apparatus, said fault processing unit selects the spare apparatus and reconstructs the apparatus pair.

4. A system according to claim 1, wherein a combination of said pair number and said hub number is set to a communication identifier of the apparatus.

5. A system according to claim 1, further comprising:
an initialization processing unit which, when a failed apparatus is exchanged to a new apparatus, requests said internal network to distribute software for synchronization, receives the distribution of said software for synchronization from one of the specific pair apparatuses which received the allocation of a software distributing apparatus, and constructs said synchronization processing unit, said fault detecting unit, and said fault processing unit.

6. A system according to claim 5, wherein said fault processing unit constructed in a fixed function unit by said initialization processing unit issues a spare adding notification to said internal network and constructs a spare apparatus pair together with the apparatus to which the pair application has been made.

7. A redundant construction control method of a high reliability system in which a plurality of apparatuses are mutually connected through an internal network, apparatus pairs are constructed with respect to said plurality of apparatuses, and spare apparatuses are allocated, thereby giving redundancy, the method compromising:
executing a service processing for providing service peculiar to each apparatus pair through an external network;
synchronizing processes in said service processing between the apparatuses constructing the apparatus pair through the internal network;
detecting a fault of a pair partner apparatus; and
executing a fault processing, when the fault of the pair partner apparatus is detected in said detecting, including issuing a pair request to the internal network and reconstructing the apparatus pair by substituting an apparatus to which a pair application has been made for the pair partner apparatus which detected the fault,
wherein in said synchronizing, a management table in which pair numbers showing the pairs in correspondence to apparatus numbers have been stored is managed, the apparatus having the same pair number as that of the self apparatus in said management table is recognized as a pair partner apparatus, and the synchronizing process is executed,
said synchronizing includes storing a hub number of a hub connected to the external network, a spare flag showing the spare apparatus, and a failure flag showing a failed apparatus into said management table in addition to the pair numbers corresponding to the apparatus numbers, and
in said fault processing, when the pair applications are received from a plurality of processing apparatuses, a new pair partner apparatus is selected based on the pair number and the hub number in said management table and the apparatus pair is reconstructed, wherein in said fault processing, when the pair applications are received from a plurality of processing apparatuses, the following five rules are sequentially applied and the pair partner apparatus is determined and reconstructed:

a first rule by which the apparatus having the different hub numbers and the same pair number as those of the pair apparatus and having the same hub number and the same pair number as those of the apparatus which has been the latest pair is set to the pair partner apparatus;

a second rule by which the apparatus having the different hub number and the same pair number is set to the pair partner apparatus;

a third rule by which the apparatus having the different hub number and the different pair number as those of the pair apparatus and having the same hub number and the same pair number as those of the apparatus which has been the latest pair is set to the pair partner apparatus;

a fourth rule by which the apparatus having the different hub number and the different pair number is set to the pair partner apparatus; and a fifth rule by which the apparatus having the same hub number and the different pair number is set to the pair partner apparatus.

8. A method according to claim 7, wherein in said fault processing, the software for realizing a function of said service processing and processing data are transferred and copied to the pair partner apparatus through the internal network, thereby constructing the same service processing and shifting the service processing to the synchronizing process.

9. A method according to claim 7, wherein in said fault processing, when the pair applications are received from a plurality of processing apparatuses, a vacant apparatus other than the spare apparatuses is preferentially selected and the apparatus pair is reconstructed, and when there is no application from said vacant apparatus, the spare apparatus is selected and the apparatus pair is reconstructed.

10. A method according to claim 7, wherein a combination of said pair number and said hub number is set to a communication identifier of the apparatus.

11. A method according to claim 7, further comprising:

initializing when a failed apparatus is exchanged to a new apparatus, said internal network is requested so as to distribute synchronization functional software, the distribution of said software for synchronization is received from one of the specific pair apparatuses which received the allocation of a software distributing apparatus, and said synchronizing, said detecting, and said fault processing are constructed.

12. A method according to claim 11, wherein in said fault processing constructed in a fixed function unit by said initializing, a spare adding notification is issued to said internal network and a spare apparatus pair is constructed together with the apparatus to which the pair application has been made.

13. A computer-readable storage medium which stores a program for allowing a computer to execute processing, said computer constructing each apparatus of a high reliability system in which a plurality of apparatuses are mutually connected through an internal network, apparatus pairs are constructed with respect to said plurality of apparatuses, and spare apparatuses are allocated, thereby giving redundancy, said processing comprising:

executing a service processing for providing service peculiar to each apparatus pair through an external network;

synchronizing processes in said service processing between the apparatuses constructing the apparatus pair through the internal network;

detecting a fault of a pair partner apparatus; and executing a fault processing when the fault of the pair partner apparatus is detected in said fault detecting, including issuing a pair request to the internal network and reconstructing the apparatus pair by substituting an apparatus to which a pair application has been made for the pair partner apparatus which detected the fault, and wherein in said synchronizing, a management table in which pair numbers showing the pairs in correspondence to apparatus numbers have been stored is managed, the apparatus having the same pair number as that of the self apparatus in said management table is recognized as a pair partner apparatus, and the synchronizing process is executed, wherein said synchronizing includes storing a hub number of a hub connected to an external network, a spare flag showing the spare apparatus, and a failure flag showing a failed apparatus into said management table in addition to the pair numbers corresponding to the apparatus numbers, and in said fault processing, when the pair applications are received from a plurality of processing apparatuses, a new pair partner apparatus is selected based on the pair number and the hub number in said management table and the apparatus pair is reconstructed, wherein in said fault processing, when the pair applications are received from a plurality of processing apparatuses, the following five rules are sequentially applied and the pair partner apparatus is determined and reconstructed:

a first rule by which the apparatus having the different hub number and the same pair number as those of the pair apparatus and having the same hub number and the same pair number as those of the apparatus which has been the latest pair is set to the pair partner apparatus;

a second rule by which the apparatus having the different hub number and the same pair number is set to the pair partner apparatus;

a third rule by which the apparatus having the different hub number and the different pair number as those of the pair apparatus and having the same hub number and the same pair number as those of the apparatus which has been the latest pair is set to the pair partner apparatus;

a fourth rule by which the apparatus having the different hub number and the different pair number is set to the pair partner apparatus; and a fifth rule by which the apparatus having the same hub number and the different pair number is set to the pair partner apparatus.

14. A computer-readable storage medium according to claim 13, wherein in said fault processing, the software for realizing a function of said service processing and processing data are transferred and copied to the pair partner apparatus through the internal network, thereby constructing the same service processing and shifting the service processing to the synchronizing process.

15. A computer-readable storage medium according to claim 13, wherein in said fault processing, when the pair applications are received from a plurality of processing apparatuses, a vacant apparatus other than the spare apparatuses is preferentially selected and the apparatus pair is reconstructed, and when there is no application from said vacant apparatus, the spare apparatus is selected and the apparatus pair is reconstructed.

16. A computer-readable storage medium according to claim 13, wherein a combination of said pair number and said hub number is set to a communication identifier of the apparatus.

17. A computer-readable storage medium according to Claim 13, further comprising:

initializing, when a failed apparatus is exchanged to a new apparatus, said internal network is requested so as to distribute synchronization functional software, the distribution of said software for synchronization is received from one of the specific pair apparatuses which received the allocation of a software distributing apparatus, and said synchronizing, said detecting, and said fault processing are constructed.

18. A computer-readable storage medium according to claim 17, wherein in said fault processing constructed in a fixed function unit of said exchanged apparatus by said initializing, a spare adding notification is issued to said internal network and a spare apparatus pair is constructed together with the apparatus to which the pair application has been made.

* * * * *